(12) United States Patent
Smith

(10) Patent No.: US 7,097,553 B2
(45) Date of Patent: Aug. 29, 2006

(54) METHOD AND APPARATUS FOR FORMING A SHAPED MEAT PRODUCT

(76) Inventor: Jeffrey P. Smith, 2586 Canterbury Rd., Columbus, OH (US) 43221

( * ) Notice: Subject to any disclaimer, the term of this patent is extended or adjusted under 35 U.S.C. 154(b) by 512 days.

(21) Appl. No.: 10/606,103

(22) Filed: Jun. 25, 2003

(65) Prior Publication Data

US 2004/0265454 A1    Dec. 30, 2004

(51) Int. Cl.
*A22C 18/00*    (2006.01)
(52) U.S. Cl. ....................................................... 452/167
(58) Field of Classification Search ................ 452/167, 452/170, 149, 150, 155
See application file for complete search history.

(56) References Cited

U.S. PATENT DOCUMENTS

| 356,725 | A | * | 1/1887 | Moses | 452/149 |
| 6,688,961 | B1 | * | 2/2004 | Smith | 452/160 |
| 6,921,326 | B1 | * | 7/2005 | Smith | 452/160 |

* cited by examiner

*Primary Examiner*—Thomas Price
(74) *Attorney, Agent, or Firm*—Mueller and Smith, LPA

(57) ABSTRACT

Method and apparatus for forming a shaped meat product by cutting under compression. Male and female die assemblies carried by dual conveyers are loaded with meat components and brought together in compression to define a die. The assemblies are formed with arrays of blade receiving slits and are conveyor transported to a cutting station. At the station, carriage mounted dynamic blades are maneuvered into the slits from the outward sides of the die assemblies to form any of a broad variety of geometric-shaped meat products.

30 Claims, 19 Drawing Sheets

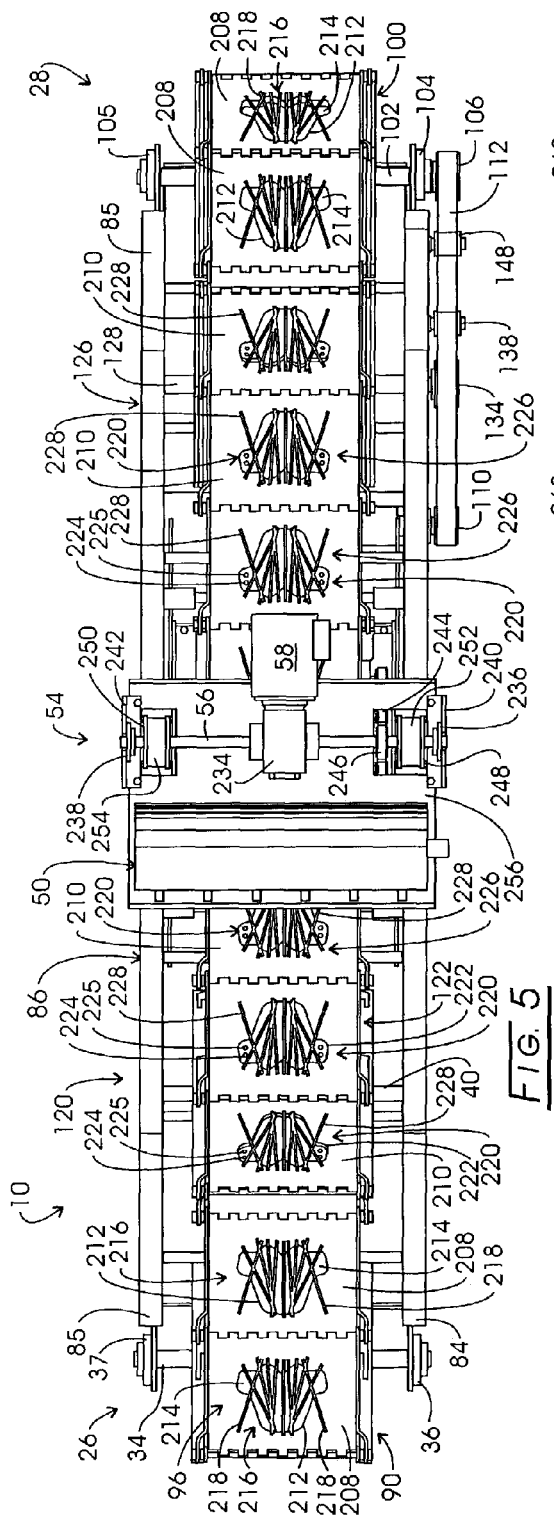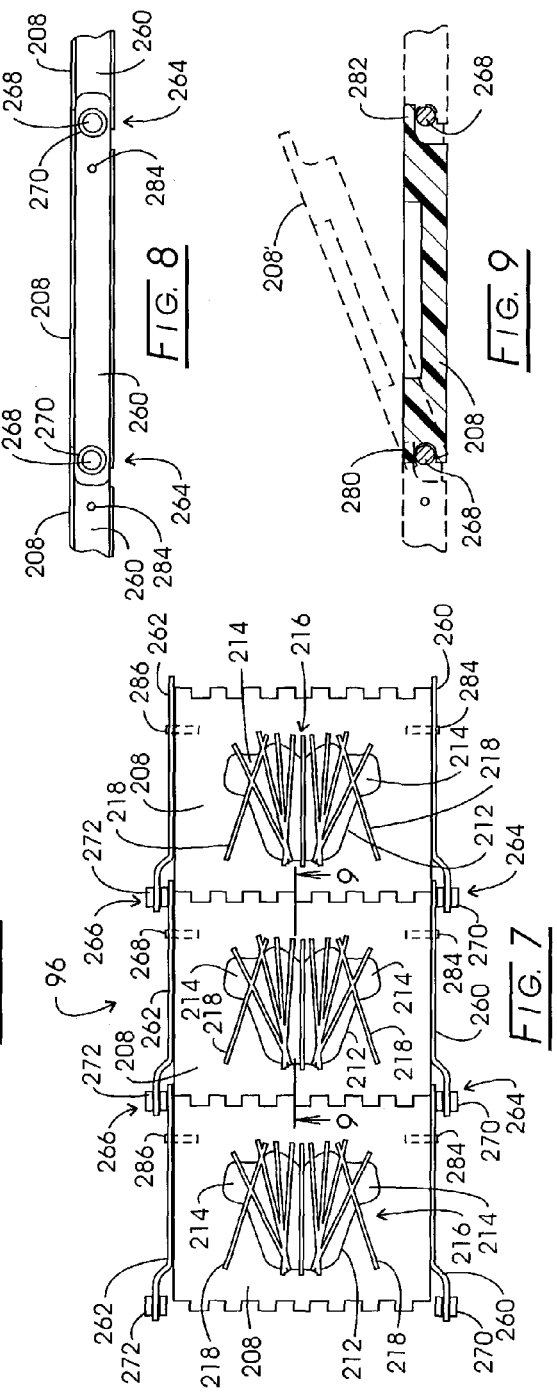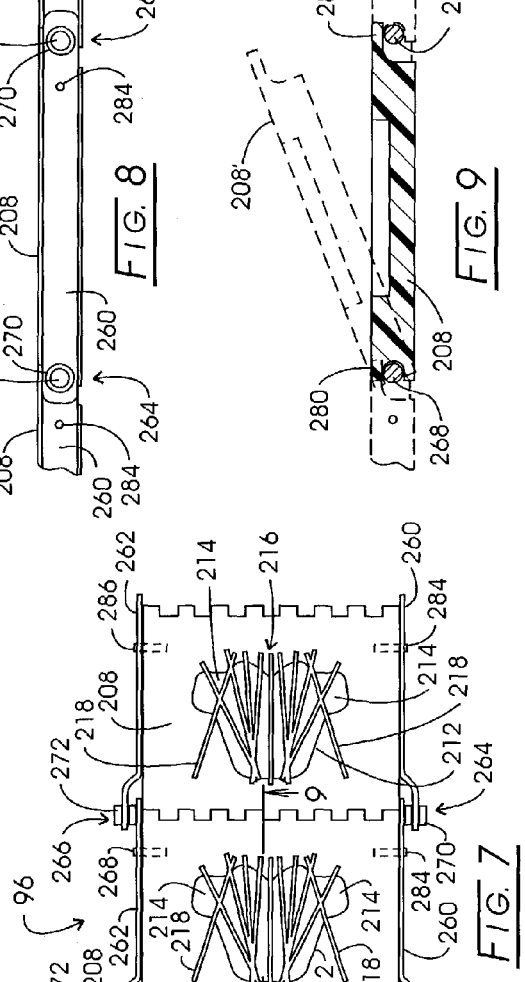

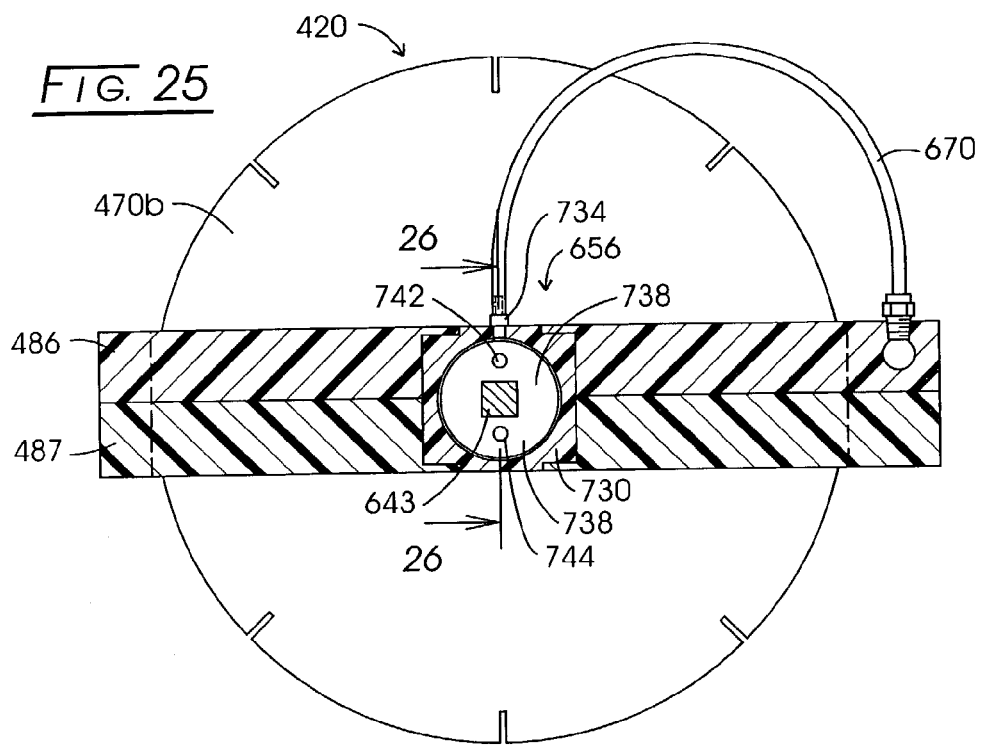
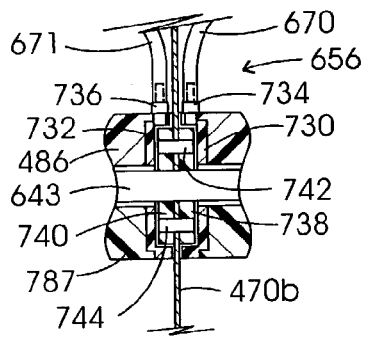
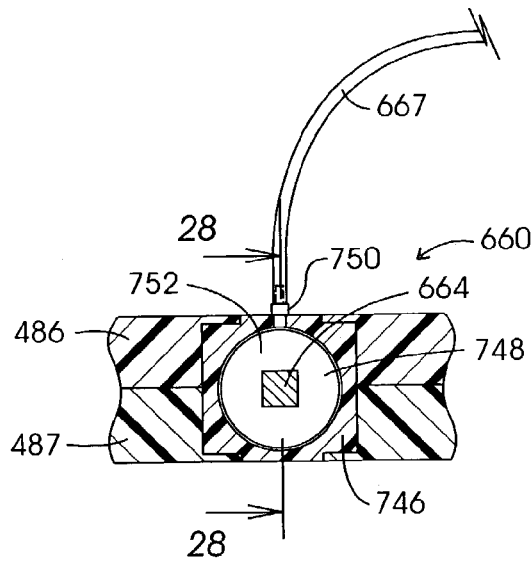
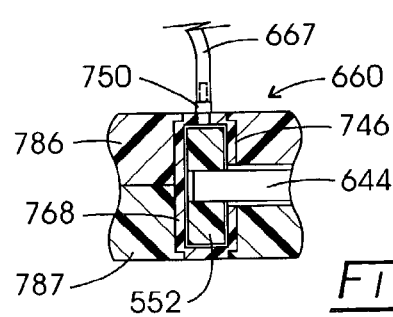

METHOD AND APPARATUS FOR FORMING A SHAPED MEAT PRODUCT

CROSS-REFERENCE TO RELATED APPLICATIONS

STATEMENT REGARDING FEDERALLY SPONSORED RESEARCH

Not applicable.

BACKGROUND OF THE INVENTION

The retail food industry, particularly those organizations providing convenience or fast food to the consumer, continue to call upon meat processing entities to produce products having a variety of controlled shapes. Each product should exhibit a specified shape in support of improved marketability to the public. Additionally, the product supplied should be uniform in terms of such shape as well as in weight to facilitate its efficient cooking. These geometric criteria also are referred to as "template requirements." Such requirements attend the esthetic appearance of the meat product on the plate or support upon which it is placed. Production formation of the products also should avoid undesirable meat components such as zones normally exhibiting an excessive fat content.

While variety of meat products have been contemplated or have been purchased with such specialized processing, over the somewhat recent past, substantial interest has occurred in connection with the breast portion of poultry. This interest has been the result largely of consumer demand attributed to the recommendations of medical groups that red meat should be substituted with poultry or fish having a relatively lower percentage of saturated fat. Initial breast of poultry products were of cutlet size either plated by restaurants or finding their way between sandwich bun halves. Less valuable trim from these cutlets typically has been ground and fashioned of formed, nugget-like products.

A variety of mechanisms were developed for carrying out the task of apportioning poultry breast into cutlets. For the most part they unreliably cut meat portion margins and failed to accommodate for the inherent orientation memory of muscle fibers. The former separation defect required hand trimming to achieve an acceptable profile, while the latter defect resulted in uneven cooking attributes.

In 1995, Smith introduced a controlled volume poultry breast apportioner which exhibited the advantages of carrying out very reliable separation and which functioned to accurately overcome orientation memory to achieve both uniform thickness from portion-to-portion and contribute to improved cooking attributes. Described in U.S. Pat. No. 5,569,070, issued Oct. 29, 1996, the apportioner employs a blade containing an upper cutting head die wherein the blade is combined with a rearwardly disposed compression surface. This upper die cooperates with a sequence of platens each of which incorporates a boundary slot for receiving the die blade and an associated bearing surface configured to engage the compression surface. This combination achieves highly reliable severing. The apparatus further incorporates a thickness defining compression component which both reduces orientation memory and controls the shape of the resultant meat product. The Smith device efficiently prepares poultry breast cutlets from breast having weights ranging from about 7 ounces to about 28 ounces.

More recently, chicken producers in the United States have been called upon to grow larger birds which, in turn, provide larger breasts ranging in weight from about 16 to about 24 ounces. To accommodate for these larger sizes, some producers have "horizontally" severed the breast in half prior to submitting them to apportioning systems. When so severed in half, the thinner tapering rearward region of the breast is unavailable for forming primary cutlets, the weight-based value of which is comparatively higher. Correspondingly, a substantial portion of the original breast is consigned to less profitable forms of meat which, as noted above are ground.

In 2002, Smith developed a method for apportioning these larger poultry breasts which provides a substantially improved yield of higher quality products intended for plate or bun utilization. Employing an adaptation of the earlier Smith apportioning apparatus, the method utilizes dual conformance paddle assemblies having compression surfaces. One such assembly is used to form with a platen mounted forward containment wall, a forward breast portion of uniform thickness $t_1$. A second such conformance paddle assembly is utilized in conjunction with a platen mounted rearward containment wall to form a rearward compressed breast portion of uniform thickness, $t_2$ which is selected to be about one half the thickness, $t_1$. A die assembly then is utilized to complete the product peripheral definition with a trimming action. Then, the peripherally defined, uniformly thick forward portion is severed "horizontally" to derive two or more quality meat products. Typically, each of these forward products will exhibit a thickness, $t_1/t_2$.

Retail food marketing entities now have turned their attention to more elaborate poultry breast configurations. For instance, chicken tenders have found popularity. However, the availability of these tenders from meat processor sources is quite limited. Thus, a call has been made for tender-like cuts of poultry breast meat. Marketing entities have also looked to other shapes of unground breast products such as having a generally rectangular shape. For all such shapes, purchasers have specified that the resultant breast meat product may not contain high fat content peripherally disposed rib meat.

Heretofore, the finger-like tender emulating shapes have been produced by resort to quite expensive and somewhat labor intensive water jet cutting systems. These systems evolve inherently lower yield do, inter alia, to the loss of meat representing a saw-like "kerf" as a part is defined. Further, there is little, if any, three dimensional stabilization over the meat product during its formation to provide control over voids. Accordingly, new systems and attendant machinery are called for which exhibit a necessary flexibility for accurately forming a variety of three dimensionally stable meat product shapes while remaining cost effective.

BRIEF SUMMARY OF THE INVENTION

The present invention is addressed to method and apparatus for forming a shaped meat product from a meat component. With the method, a broad variety of geometric shapes may be formed, for instance, ranging from poultry breast products emulating breast tenders to a plethora of polyhedron shapes including "nuggets" fashioned from solid, i.e., unground tissue sources.

Male and female die assemblies are employed to hold and carefully compress the starting meat component into a pre-cutting profile. This profile forming and compression procedure derives a consistent thickness profile without damaging or breaking the meat tissue structure. Such controlled compression is achieved, inter alia, by design of the protruding male die component of the male die assemblies.

Both the male and female die assemblies are configured with an array of slots patterned to define the individual meat products to be produced. Cutting access to these slots is from the outward sides of the male and female die assemblies, their inward sides being mated in compression to define a die. By so arranging these slots, essentially any product-defining slot pattern may be designed while retaining the integrity of the die structure.

The compressed, meat retaining dies are transported by a dual conveyer system to a cutting station incorporating one or more carriages supported dynamic cutting blades. By moving each such carriage in a reciprocating blade cutting routine, the structural die integrity is maintained. While a range of dynamic blade types may be employed with the system, for the poultry breast treatment embodiment disclosed, circular, single point blades are employed. Such blades function as knives as opposed to saw blades. As a consequence, a more efficient utilization of meat product is achieved, inasmuch as no saw generated "kerf" meat is lost. The blades may assume a broad range of angular orientations. Drive to the blades is provided with articulated drive shafts which, in turn, are driven from an endless timing belt permitting this drive to be sustained even during reciprocal movement of the blade carriages. Material contamination of the system is avoided through the utilization of mutually contacting plastic products exhibiting different hardness attributes. Where bearings are utilized, both the dual plastic approach and water lubrication are employed to substantially reduce friction. With the invention, meat products are produced readily meeting the template requirements of the retail food industry.

Another feature and object of the invention is to provide a method for forming a geometrically shaped meat product from a meat component of given peripheral and volumetric shape, comprising the steps of:

(a) providing a female die assembly with an outward side and an inward side with one or more cavities having inwardly disposed peripheral wall portions generally corresponding with the meat component peripheral shape and having slots defining the meat product geometric shape, first ones of the slots being configured for receiving a meat cutting blade from the outward side, and second ones of the slots being configured for receiving a meat cutting blade at the inward side;

(b) providing a male die assembly with an outward side and an inward side, having slots defining the meat product, third ones of the slots being configured for receiving a meat cutting blade from the outward side and corresponding with the second ones of the slots, and fourth ones of the slots being configured for receiving a meat cutting blade from the inward side and corresponding with the first ones of the slots;

(c) positioning the meat component upon one die assembly, the given peripheral shape being generally aligned with the inwardly disposed peripheral walls of the female die assembly;

(d) aligning the male and female die assemblies to effect a positioning of the second ones of the slots in alignment with the third ones of the slots and a positioning of the first ones of the slots in alignment with the fourth ones of the slots;

(e) compressing the meat component between the male and female die assemblies;

(f) providing at least one first cutting blade and at least one second cutting blade;

(g) moving the first cutting blade into cutting relationship with the meat component from the female die assembly outward side through the aligned first and fourth ones of the slots;

(h) removing the first cutting blade from the first and fourth ones of the slots;

(i) moving the second cutting blade into cutting relationship with the meat component from the male die assembly outward side through the aligned second and third ones of the slots;

(j) removing the second cutting blade from the second and third ones of the slots; and (k) removing geometrically shaped meat product from at least one of the die assemblies.

Other objects of the invention will, in part, be obvious and will, in part, appear hereinafter. The invention, accordingly, comprises the method and apparatus possessing the construction, combination of elements, arrangement of parts and steps which are exemplified in the following detailed description.

BRIEF DESCRIPTION OF THE DRAWINGS

FIG. 5 is a top view of the apparatus of FIG. 2 with components removed to reveal internal structure;

FIG. 7 is a partial top view of the apparatus of FIG. 5 showing a configuration of female die assemblies;

FIG. 8 is a partial view showing conveyor structure;

FIG. 9 is a sectional view taken through the plane 9—9 shown in FIG. 7

FIG. 15A is a sectional view taken through the plane 15A—15A shown in FIG. 15;

FIG. 25 is a sectional view taken through the plane 25—25 shown in FIG. 23;

FIG. 26 is a sectional view taken through the plane 26—26 shown in FIG. 25;

FIG. 27 is a sectional view taken through the plane 27—27 shown in FIG. 23; and

FIG. 28 is a sectional view taken through the plane 28—28 shown in FIG. 27.

DETAILED DESCRIPTION OF THE INVENTION

Figure 1:
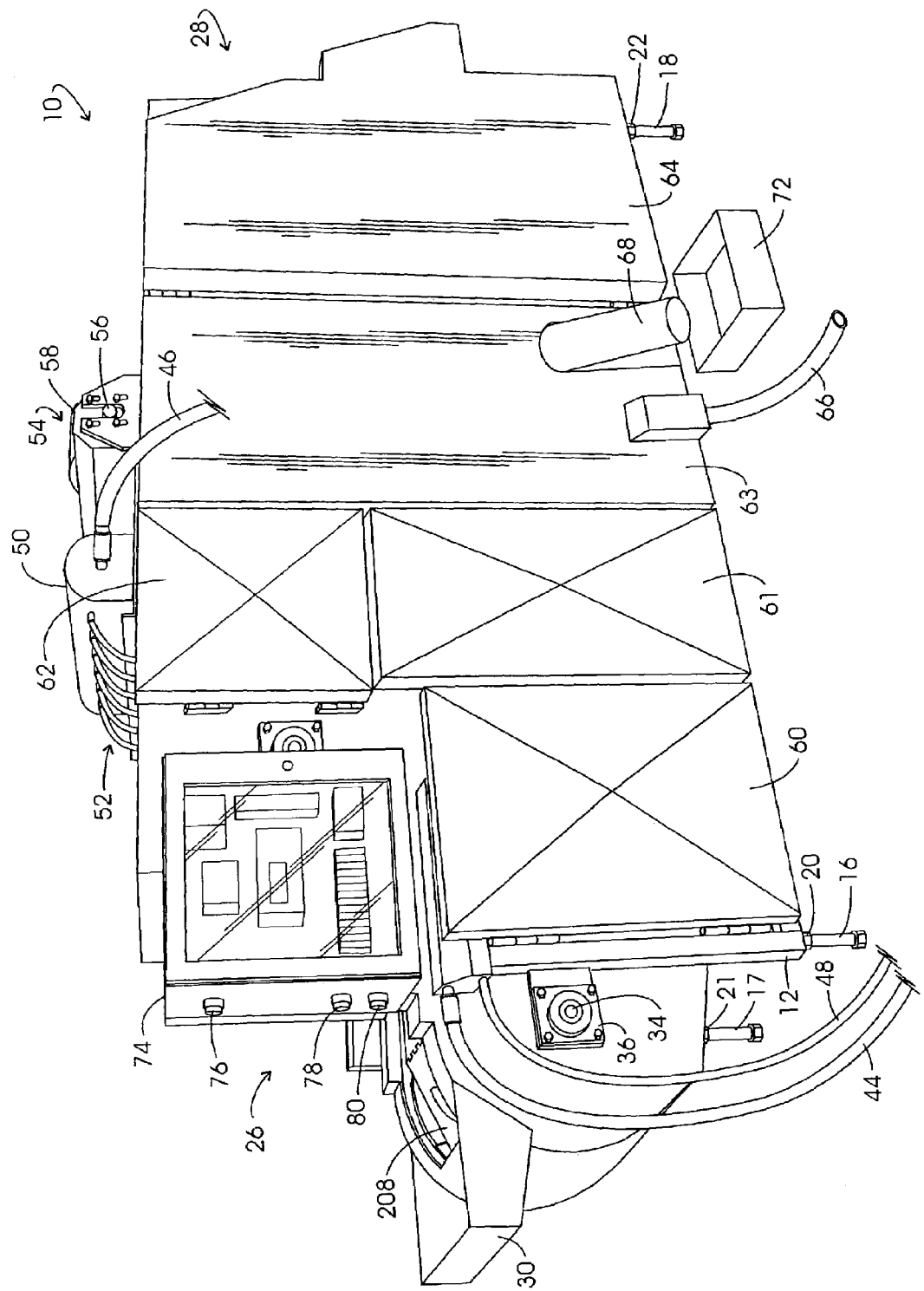
FIG. 1 is a perspective view of meat product forming apparatus according to the invention.

Referring to FIG. 1, apparatus according to the invention is represented generally at 10. Apparatus 10 is configured for producing or forming a geometrically-shaped meat product from a meat component present as a poultry (chicken) breast at 10. The meat product for which the apparatus 10 is tooled is a generally elongate tapered one having a shape generally emulating a chicken tender. However, apparatus 10 can be configured to form about any meat product configuration that marketing entities can imagine, for instance, some polyhedron shape. Such configurations can accommodate a range of meat types.

Apparatus 10 comprises a frame having four corner positioned legs or vertical supports, one of which is shown at 12 extending to a foot 16 which is adjustable for leveling purposes by a threaded engagement with leg 12 which is fixed by a hex jam nut as at 20. Two other corner located feet are seen at 17 and 18 in association with respective hex jam nuts 21 and 22. Apparatus 10 is configured with an entrance region represented generally at 26 and an exit or output region represented generally at 28. At the entrance region 26 a tray 30 is seen projecting outwardly which functions to receive pre-processed meat components, here whole, boneless, skinless chicken breast. Tray 30 also functions as a guard. Confronting the tray 30 are a sequence of conveyer mounted female die assemblies one of which is revealed at 208. These die assemblies will index to the orientation shown to be hand loaded from the tray 30 by an operator. The lower conveyer supporting the female die assemblies rotates about an idler shaft 34 mounted within bearings, one of which is shown at 36. A similar idler or shaft is seen at 40 within a bearing 42. Shaft 40 will be seen to supporting the idler sprocket of a conveyer mounted male die assembly. Extending into the apparatus 10 are three external inputs: a water input line 44; a compressed input line 46; and an electrical cable input 48. Compressed air input line 46 is seen extending to a compressed air manifold 50 from which a compressed air line array 52 extends for introduction to a variety of nozzles and other components within apparatus 10. Positioned rearwardly of manifold 50 is a blade drive assembly represented generally at 54 incorporating a blade drive shaft 56 and an electric motor 58. Each side of apparatus 10 is enclosed by a series of door-like guards, certain of which are seen at 60–64. Extending outwardly from door 63 is a liquid and scrap conduit 66 and a trim removal chute 68 which empties into a receiving tray 72. Control over the apparatus 10 is derived from circuitry within a control box 74. Extending from the box 74 for access by the operator standing at the entrance region 26 are an emergency stop switch 76, a start switch 78 and a stop switch 80. In general, the apparatus 10 is formed with stainless steel and other food grade components.

Figure 2:
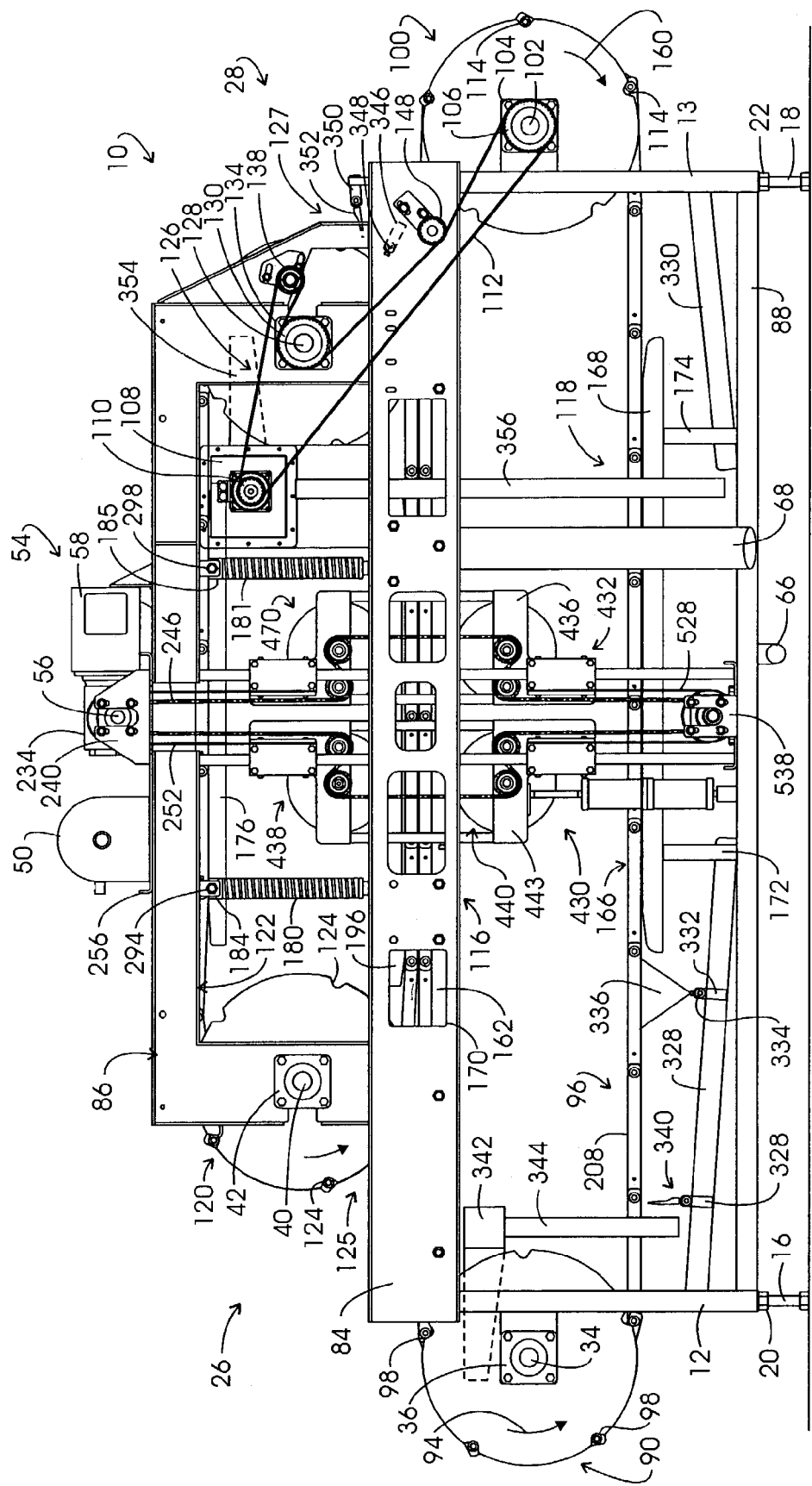
FIG. 2 is a front view of the apparatus of FIG. 1 with components thereof removed to reveal internal structure.

Referring to FIG. 2, apparatus 10 is revealed in side view fashion with the removal of guard components and the like to facilitate the description of its internal structuring. Its stainless steel frame is seen to include earlier-described leg 12 as well as leg 13 which are weldably connected to an intermediate beam 84. A similar intermediate beam 85 is positioned on the opposite side of apparatus 10. Mounted upon beams as at 84 is a stainless steel upper frame assembly represented generally at 86 which is seen, inter alia, to support the air manifold 50 and blade drive assembly 54. The lower portion of the leg components as at 12 and 13 support a stainless steel collection tray 88 which also functions as a structural component of the frame. Bearing 36 along with idler drive shaft 34 reappear in conjunction with a lower conveyer idler sprocket assembly represented generally at 90. Sprocket assembly 90 indexibly rotates in the direction represented at arrow 94 and supports a lower conveyer assembly represented generally at 96. Conveyer 96 providing a component of a die transport assembly is engaged by notches within the sprocket assembly 90 certain of which are revealed at 98. Conveyer 96 extends to the exit region 28 to be operatively associated with a lower conveyer drive sprocket assembly represented generally at 100 incorporating a drive shaft 102 seen extending through a right hand bearing 104 to a connection with a drive sprocket 106 formed of aluminum. Drive sprocket 106, in turn, is driven in indexing or intermittent fashion from a stepper motor 108 mounted upon the upper frame assembly 86. The output shaft of motor 108 is coupled to a drive sprocket 110 which, in turn, engages a timing belt 112 coupled in driving relationship with lower conveyer drive sprocket 106.

As in the case of sprocket assembly 90, sprocket assembly 100 is formed with five notches, certain of which are revealed at 114 which function to engage the conveyer 96. Conveyer sprocket assemblies as at 90 and 100 may assume a variety of configurations, for example, being configured of stainless steel with a generally hexagonal configuration or of a food grade ultra high molecular weight polyethylene plastic (UHMW). An upwardly disposed intermediate region is represented generally at 116 is identified between entrance region 26 and exit region 28, while a lower return region is represented generally at 118.

Upper frame assembly 86 supports an upper conveyer idler sprocket assembly represented generally at 120. Assembly 120 is mounted upon idler shaft 40 which is supported, in turn, by bearings, one of which is represented at 42. Assembly 120 supports an upper conveyer represented generally at 122 by engagement therewith at notches, certain of which are shown at 124. Conveyer 122 functions as a component of a die transport assembly and extends from a lower entrance region 125 to a lower exit region 127 and is mounted in driven relationship with an upper conveyor drive sprocket assembly represented generally at 126. Assembly 126 is mounted upon a drive shaft 128 which extends from bearings one of which is shown at 130 to connection with a drive sprocket 134 which is coupled by timing belt 112 in driven relationship with stepper motor 110.

Figure 3:
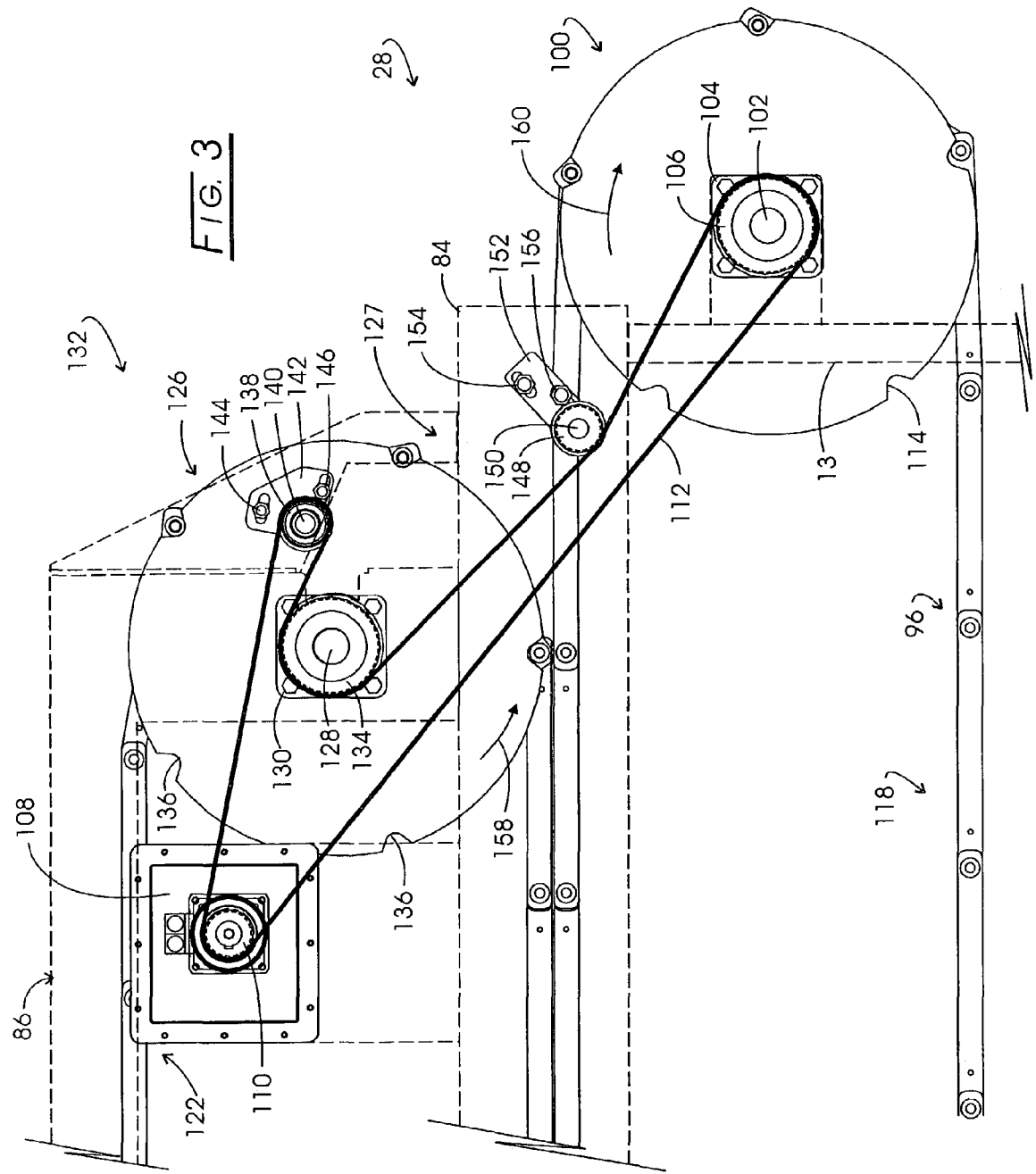
FIG. 3 is a broken away front view of the apparatus of FIG. 2 with components removed to reveal a conveyor drive assembly.

Looking additionally to FIG. 3, the conveyor drive assembly or transport actuator is represented in general at 132.

Drive sprocket assembly 126 is seen to be configured with notches certain of which are revealed at 136 which engage the link assemblies of upper conveyer assembly 122. Note that the timing belt or drive belt 112 is engaged with an idler sprocket 138 mounted upon idler shaft 140 which, in turn, is fixed to and extends outwardly from an adjustment bracket 142. Bracket 142 is configured to provide for tension adjustment of the belt 112 by virtue of its connection through bolt and slot assemblies 144 and 146 to upper frame assembly 86. Sprocket 138 is employed to adjust the tension of timing belt 112.

Also engaged with the timing belt 112 is an idler sprocket 148 mounted upon an idler shaft 150. Shaft 150 is fixed to and extends from an adjustment bracket 152. Adjustment of bracket 152 is carried out by the operator by manipulation of bolt and slot assemblies 154 and 156 which are coupled, in turn, to intermediate beam or frame member 84. Idler sprocket 148 is adjustable to provide for phase alignment between the respective female and male die assemblies carried by conveyer assemblies 122 and 96. With the arrangement shown, conveyer drive sprocket assembly 126 will be drivably rotated in the direction of arrow 158, while lower conveyer drive sprocket assembly 100 will be driven in the direction of arrow 160. As before, while the conveyer sprocket assemblies as at 120 and 126 may be fashioned with a variety of materials, as shown herein they are formed of the earlier noted food grade polyethylene plastic, UHMW.

Figure 4:
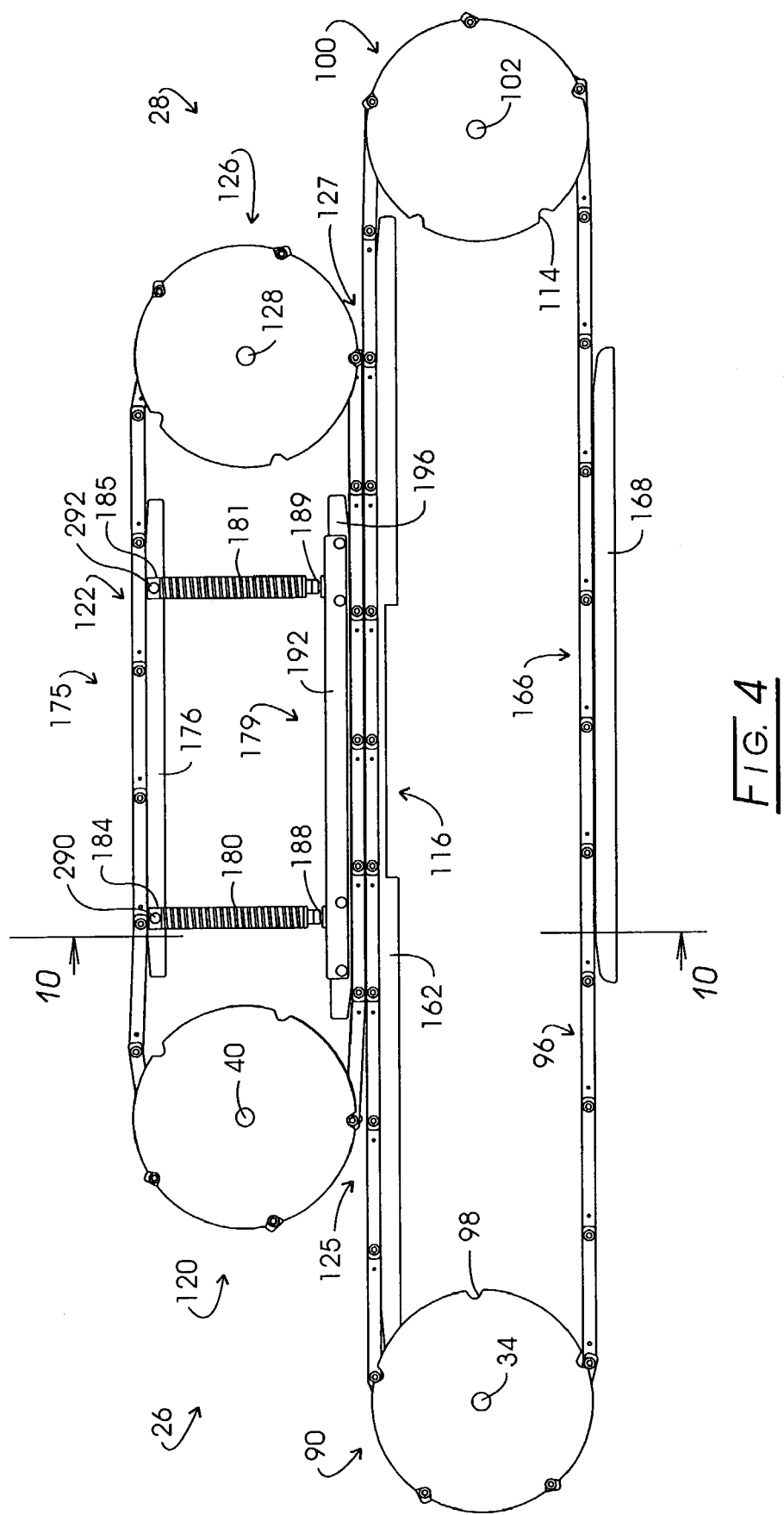
FIG. 4 is a front view of the apparatus of FIG. 2 with components removed to reveal conveyor structuring.

FIG. 4 presents another side view of the apparatus 10 with components removed to reveal portions of conveyer support and compression components. Referring to FIGS. 2 and 4, the link assemblies of lower conveyer assembly 96 carrying female die assemblies are seen supported, inter alia, by outwardly disposed lower conveyer support slide rails one of which is seen at 162. Slide rails as at 162 may be formed of the earlier-noted food grade polyethylene plastic, UHMW. The link assemblies of conveyer 96 further are supported by lower return conveyer slide rails, one of which is revealed at 168 within lower disposed return region 166. A downwardly disposed intermediate region is indicated generally at slide rail 162 seen, for instance, at access window 170 in FIG. 2. That figure also shows that return slide rail 168 is supported by stainless steel supports as at 172 and 174 extending upwardly from collection tray and frame component 88.

The instant figures further reveal that the link assemblies of upper conveyer 122 carrying male die assemblies are supported at upwardly disposed return region 175 by upper return conveyer slide rails one of which is revealed at 176. Extending from the upper frame assembly 86 are four compression spring assemblies, two of which are revealed at 180 and 181. Springs 180 and 181 extend from respective upper spring caps 184 and 185 coupled, in turn, to upper frame assembly 86 to lower spring caps 188 and 189 (FIG. 4). Caps 188 and 189 are connected to a stainless steel adjustment rail 192 which, in turn is connected to and interconnects upper conveyer compression rails, one of which is revealed at 196. These rails will be seen to be spaced inwardly from the adjustment rails as at 192. Slide rails as at 176 and compression rails at 196 are formed of the noted food grade polyethylene plastic UHMW. With the arrangement shown the male die assemblies carried by upper conveyer 122 are urged in compression towards the female die assemblies carried by the link assemblies of lower conveyer 96. Those lower conveyer carried female die assemblies, in turn, are supported to achieve this compression by the lower conveyer support side rail components as at 166. This compression action will be seen to take place within the conveyor intermediate regions wherein meat product cutting is carried out.

Referring to FIG. 5, a top view of the apparatus 10 with certain components removed for clarity is presented. In the figure, idler shaft 34 reappears at entrance region 26 in conjunction with bearing 36 and oppositely disposed bearing 37. Bearing 37 is supported from intermediate beam 85 which is located in parallel with and at the same height as corresponding intermediate beam 84. At the exit region 28, drive shaft 102 reappears in conjunction with bearing 104 and extends to bearing 105 also supported by intermediate beam 85. The lower conveyer again is identified at 96 and is shown carrying a sequence of female die assemblies, certain of which are identified at 208. Upper conveyer 122 is seen to support a sequence of male die assemblies, certain of which are identified at 210 and extends from upper conveyer idler sprocket assembly 120 mounted upon idler shaft 40 (entrance region 125) to upper conveyer drive sprocket assembly 126 (exit region 127) which is mounted upon drive shaft 128. In the figure, the inward sides of die assemblies 208 and 210 are revealed and it is these inward sides which ultimately join together in registry to compress the meat component positioned within the cavity of the female die assemblies at the loading station at entrance region 26. Die assemblies 208 and 210 are formed of a linear polyoxymethylene-type acetal resin marketed under the trade designation "Delrin".

Figure 6:
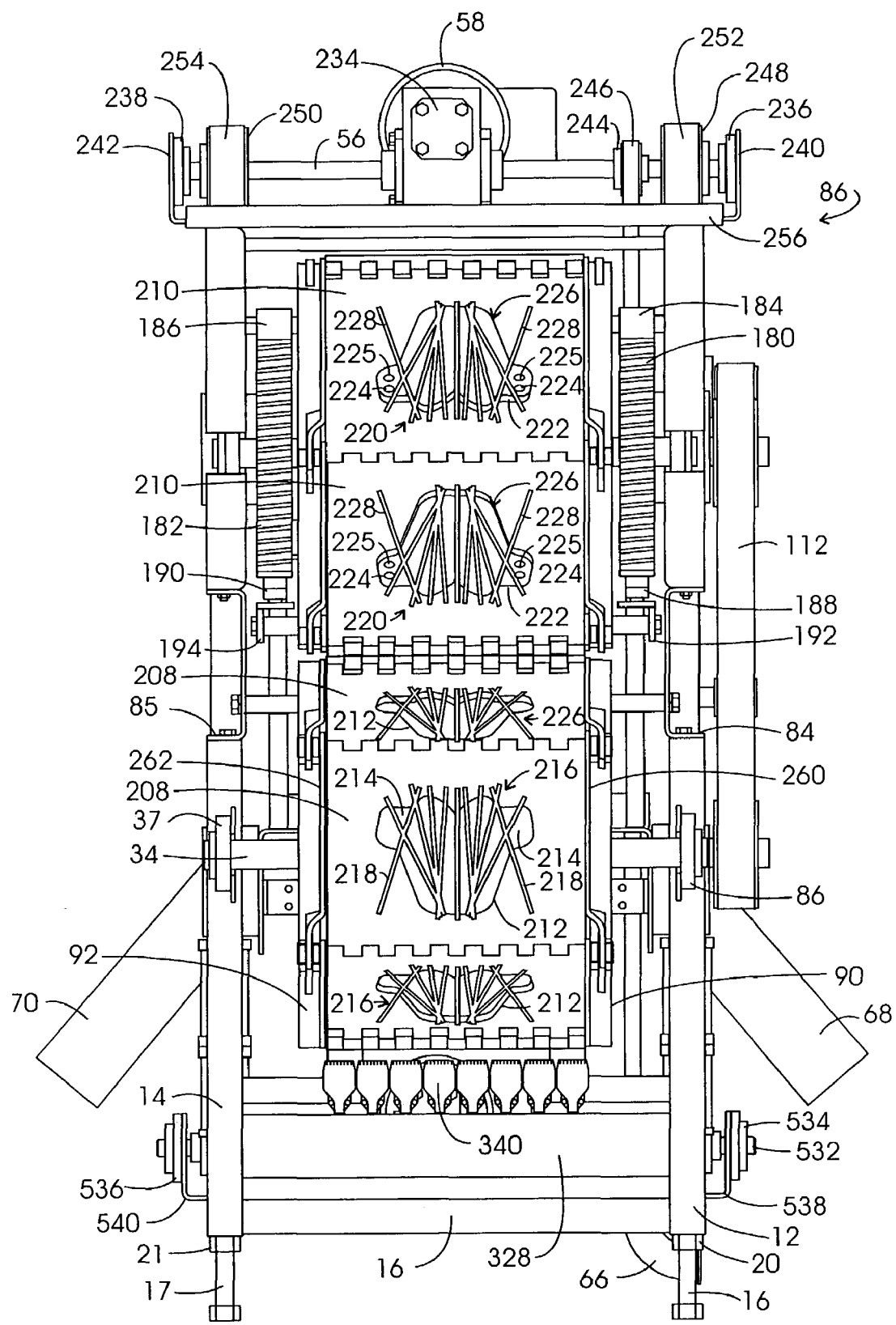
FIG. 6 is a left side view of the apparatus of FIG. 2 with components removed to reveal internal structure.

Looking additionally to FIG. 6, it may be seen that female die assemblies 208 are configured with an inwardly depending cavity defined by inwardly disposed peripheral wall certain of which are identified at 212. These peripheral walls 212 are configured to correspond with the shape of the meat product being treated by the apparatus 10. For the instant application, the walls resemble a full, skinless, boneless chicken breast. The walls 212 transition at the forward region of the die cavities into trim receiving openings certain of which are identified at 214. Each of the female die assemblies 208 also is configured with an array 216 of blade receiving slots. Those openings 214 extend entirely through the die assemblies 208. The blade receiving slot arrays 216 are configured with respect to the particular meat product being formed. For the instant application, that product will be an elongate tapered one which emulates a chicken tender. Note, additionally, that the blade receiving slot array 216 incorporates two oppositely disposed outboard blade receiving slots certain of which are identified at 218. These outboard slots 218 function to remove trim and thus, they may be seen to traverse the inward side of the trim openings 214.

Now considering the male die assemblies 210 the inward side of each supports a protruding male die member certain of which are represented in general at 220. These die members 220 are seen to have an outer periphery certain of which are shown at 222 which generally correspond with the female die cavity peripheral wall 212. With the arrangement, when the die members 220 move into engagement with the female die cavities, the male die member 220 will enter the female die assembly cavity to engage the meat product to compress it to an extent inducing a flow of the meat to fill the female die cavity as a step in the product forming procedure. Excess compression is avoided, the integrity of the meat tissue structure following this processing remaining, i.e., the tissue is not "broken". Control over this pressure is derived principally by design of the male die assembly protruding die component. The die assemblies 210 additionally are configured with trim ejection openings certain of which are identified at 224 and 225 (FIG. 12) which are configured to align with the trim receiving openings 214 of female die assemblies 218. Thus, when the two die assemblies are brought together in registry to compress and cut the meat component, these trim receiving openings and trim ejection openings will also be in registry. Each of the male die assemblies 210 also incorporates a blade receiver slot array certain of which are represented generally at 226. As in the case of the female die assemblies 208, the die assemblies 210 incorporate outboard blade receiving slots 228, certain of which are identified at 228. The blade receiving slots of arrays 216 and 226 are shown having uniform length for purposes of clarity. However, the lengths of the slots will vary depending upon which die assembly outward surface or side receives a cutting blade. In general, the cutting blade will only partially enter the inward side of the oppositely disposed die assembly. Thus, the length of the slots will vary depending upon the cutting blade configurations. Regions of the male die members 220 will be seen to be contoured to promote the noted compressively induced flow of the meat being processed. For chicken breasts, the forward peripheral portions adjacent such contouring will be maneuvered over the aligned trim-receiving openings 214 and 224. Those portions generally will contain relatively higher fat content rib meat which will be removed as trim in consequence of the cutting blade activity with respect to the then aligned outboard blade receiving slots 218 and 228.

Figure 12:
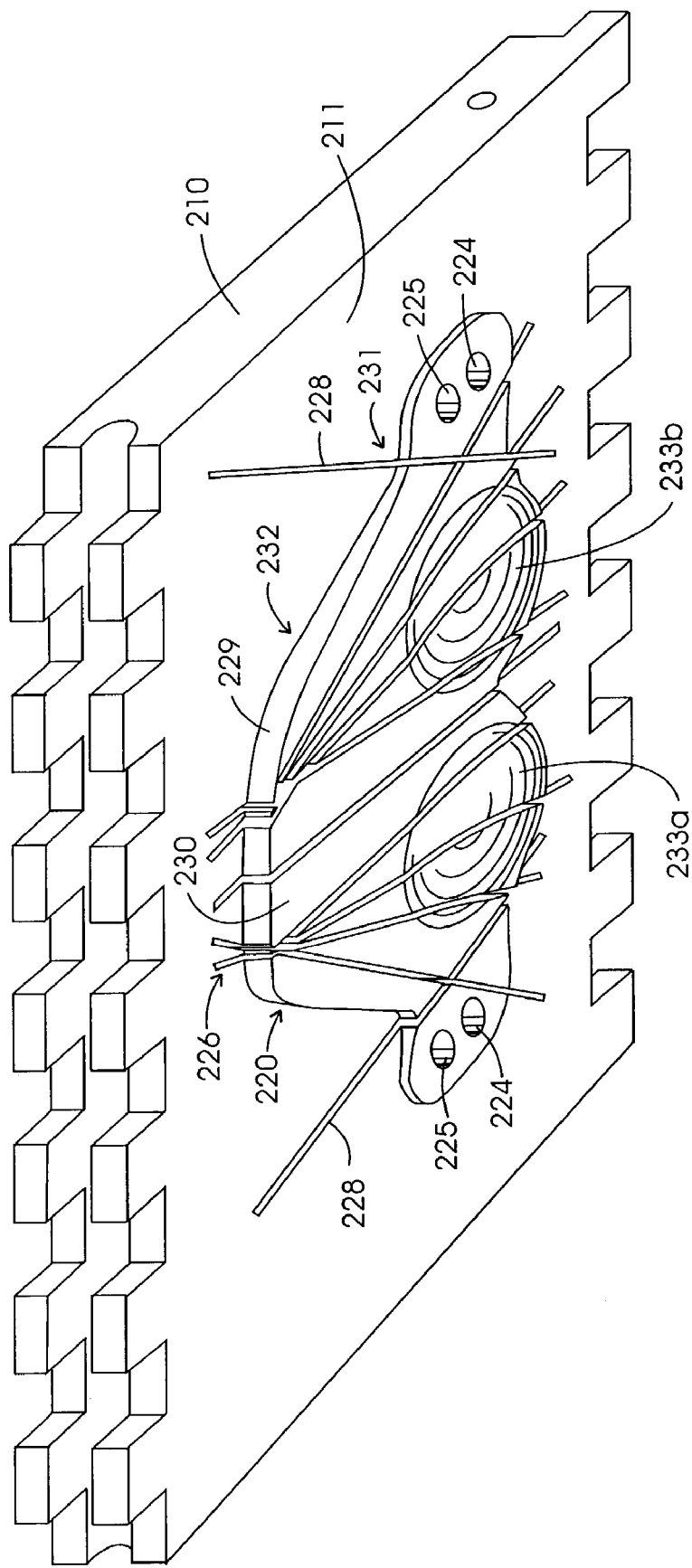
FIG. 12 is a perspective view of a male die assembly employed with the apparatus of the invention.

Referring to FIG. 12, a prospective view of a male die assembly 210 is presented and an angular orientation as it is defending to mate with a corresponding female die assembly. Protruding male die member 220 shown having a male wall 229 extending from the inward side 211 of assembly 210 to define a compression surface 230 having a wall-defined peripheral shape generally corresponding with and nestable within the female die assembly cavity. Surface 230 has a forward region represented generally at 231 which is located to contact the thicker and wider head region of a chicken breast. At this region, the die member 220 is relatively thin. However, the compression surface 230 ramps outwardly from the head region toward a rearwardly disposed region represented generally at 232 which will be compressibly contactable with the tail region of a breast component. Thus, the resultant meat product will be tapered. To maintain the integrity of the breast tissue structure at its head region, compression surface 230 is configured at a forward region 231 with oppositely disposed depressed regions 233a and 233b. The resultant breast meat product will be elongate and tapered with no discernable violation of the integrity of its tissue structure.

FIGS. 5 and 6 additionally reveal that the output of blade drive motor 58 extends to a gear reduction assembly 234 which, in turn, serves to rotate blade drive shaft 56. Assembly 234 provides a 10:1 reduction. Drive shaft 56 is supported by oppositely disposed bearings 236 and 238 which, in turn, are mounted upon respective brackets 240 and 242. Fixed to the blade drive shaft is a blade drive sprocket 244. A blade drive timing belt 246 extends in driven relationship over the sprocket 244. Drive shaft 56 further supports two, freely rotating idler sprockets 248 and 250 over which respective carriage positioning timing belts 252 and 254 extend. The above-described blade drive assembly as well as the air manifold 50 are seen to be mounted upon a pan 256 connected, in turn, to upper frame assembly 86 (FIG. 2). Each of the conveyer assemblies 96 and 122 are configured as a sequence of pivotally interconnected link assemblies. Looking to FIG. 7, a portion of lower conveyer 96 is revealed in enlarged fashion. In the figure, spaced apart links 260 and 262 are seen to be pivotally coupled together at respective pivot coupling assemblies 264 and 266. Connection and die assembly support is provided by stainless steel rods seen in FIG. 8 at 268 which may be coated or sleeved with the above-noted "Delrin" material and extends through the links 260 and 262 to support plastic bushings formed with the noted UHMW plastic. Those bushings are represented at 270 in connection with links 270, and at 272 in connection with links 262.

Female die assemblies 208 are removably mounted within the conveyer assembly 96. Looking to FIG. 9, it may be observed that die assembly 208 is configured with a laterally disposed U-shaped groove 280 at one end and an upwardly disposed lateral flange or ledge portion 282 at the opposite end. With this arrangement, the die assembly 208 may be pivoted about one rod 268 and may abut downwardly against an opposite rod 268. Assembly 210 is regularly notched at U-shaped groove 280 and is regularly notched in an offset manner at ledge 282, i.e., a box joint association is developed. To insert or remove the die assembly as at 208 it is either positioned or pivoted, for example, to the orientation shown in phantom at 208'. In installing the assembly 208, it is positioned as shown in FIG. 9, whereupon, as represented additionally in FIG. 7 oppositely disposed retainer pins as at 284 and 286 are inserted through respective links 260 and 262 and into associated bores formed within the die assembly 208. As is apparent, removal of the die assembly from the conveyer assembly involves removing pins as at 284 and 286 and pivoting the die assembly 208 upwardly.

Conveyer assembly 122 is configured in identical fashion as are the connective configuration of associated male die assemblies 210.

Figure 10:
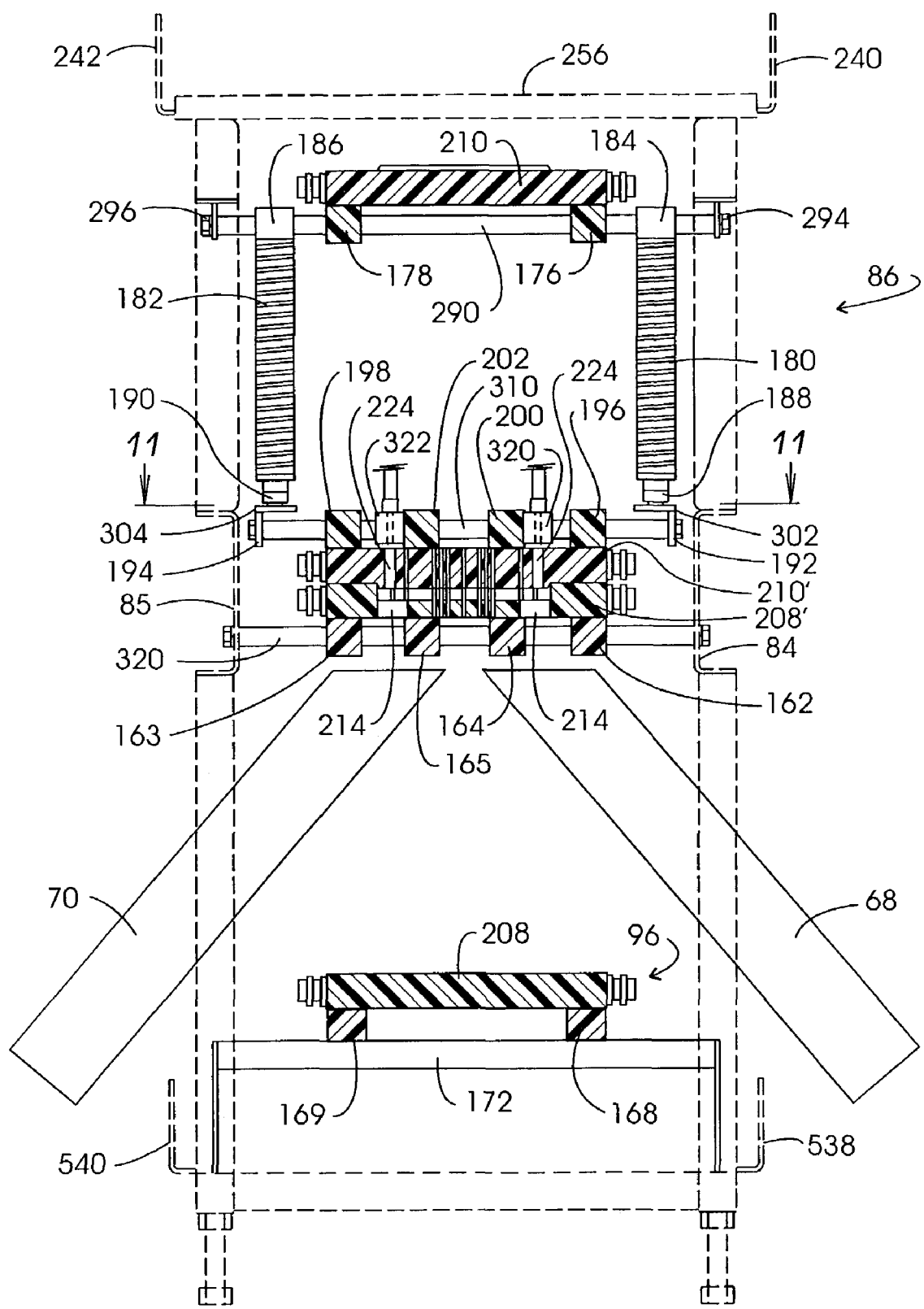
' FIG. 10 is a sectional view taken through the plane 10—10 shown in FIG. 4.
Figure 11:
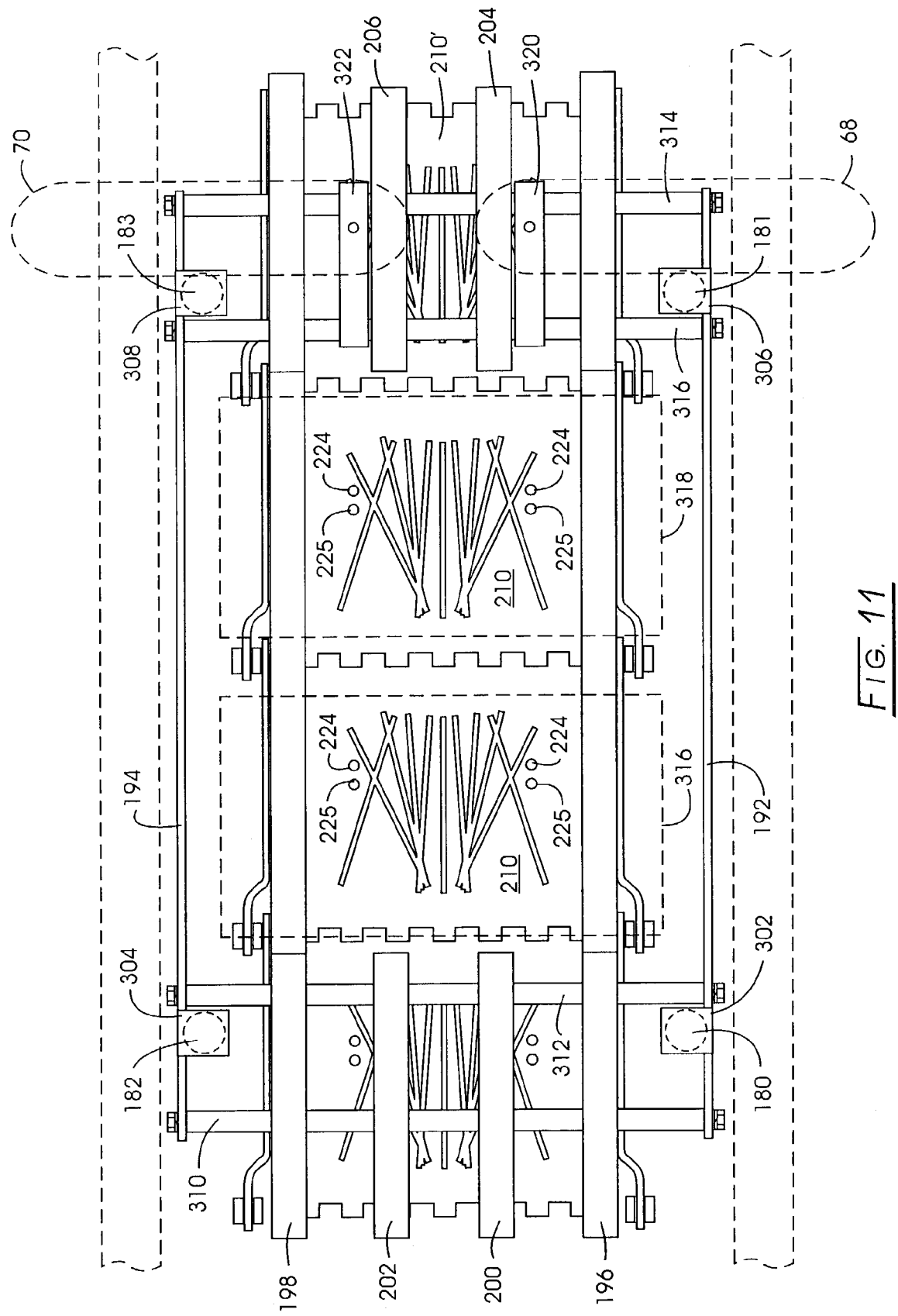
FIG. 11 is a sectional view taken through the plane 11—11 shown in FIG. 10.

In the description above in connection with FIGS. 2 and 4 right side components of conveyer support and compression rail assemblies were disclosed. Referring to FIGS. 10 and 11 these features and, where appropriate their counterparts are illustrated in heightened detail. In FIG. 10 a female die assembly 208 of conveyer 96 is seen to be slidably supported by lower return conveyer slide rails 168 and 169 thus, the "Delrin" female die assemblies 208 slide upon return conveyer slide rails formed of softer UHMW plastic. In the figure, support 172 reappears as described in connection with FIG. 2.

Within the upper frame assembly 86 male die assemblies as at 210 are seen as being slidably supported upon upper return slide rails 176 and 178. Rails 176 and 178 are supported by two horizontally disposed support rods, one of which is seen at 290 in FIG. 10 and the rearwardly disposed one of which 292 is revealed in conjunction with rod 290 in FIG. 4. Rod 290 is seen in FIG. 10 to be bolted to brackets 294 and 296 which, in turn, are attached to the upper frame assembly 86. Bracket 294 is seen in FIG. 2, while a similar rearwardly disposed bracket is shown in that figure at 298. Return slide rails 176 and 178 are formed of UHMW plastic. Note, additionally, in FIG. 10 that rod 290 extends through the upper spring caps 184 and 186 of respective springs 180 and 182. A similar spring mount is provided in conjunction with the rearwardly disposed springs 181 and 183, spring 183 appearing in FIG. 11. Looking additionally to FIG. 11, spring 180 is seen to extend to an inwardly depending flange 302 fixed, in turn, to adjustment rail 192. In similar fashion, spring 182 is connected to an inwardly depending flange 304 fixed, in turn, to adjustment rail 194. FIG. 11 reveals that spring 181 is coupled to inwardly depending flange 306 which is fixed, in turn, to adjustment rail 192 and that spring 183 is connected to inwardly depending flange 308 which, in turn, is fixed to adjustment rail 194. A support rod 310 is shown in FIGS. 10 and 11 extending between and bolted to adjustment rails 192 and 194. Rod 310 is seen in these figures as extending through and supporting upper conveyer compression rail 196 which is positioned outboard at the right hand side of apparatus 10. FIG. 11 reveals that a similar but left side elongate upper conveyer compression rail 198 also is supported from rod 310. Spaced inwardly from rod 310 is another support rod 312 which is seen to be bolted between adjustment rails 192 and 194. This support rod extends through elongate upper conveyer compression rails 196 and 198. Positioned between those rails are intermediate and shorter upper conveyer compression rails 200 and 202. Note that these rails 200 and 202 are mounted upon support rods 310 and 312 which extend therethrough. Elongate outboard upper conveyer compression rails 196 and 198 extend for support to inwardly positioned support rods 314 and 316 which are bolted to adjustment rails 192 and 194. In this regard, note that support rods 314 and 316 extend through the outboard compression rails 196 and 198 as well as through shorter upper conveyer compression rails 204 and 206. This mounting is identical to the support for shorter rails 200 and 202. All of the upper conveyer compression rails are formed of a UHMW plastic. Note that compression rails 196 and 198 extend through two rectangular dashed boundaries 316 and 318 and that the shorter rails 200, 202, 204 and 206 are located outwardly of those boundaries. Boundaries 316 and 318 represent the areas within the intermediate conveyor regions wherein two cutting stations will be seen to perform in conjunction with the meat component compression feature.

Returning to FIG. 10, lower conveyer support slide rail 162 is shown mounted upon a support rod 320 bolted between intermediate beams 84 and 85. An oppositely disposed elongate lower conveyer support slide rail 163 also is shown mounted upon rod 320. Between the elongate support rails 162 and 163 are shorter lower conveyer support slide rails 164 and 165. These shorter rails 164 and 165 are supported and configured as well as aligned with earlier-described shorter upper conveyer compression rails 200 and 202. A similar pairing of these shorter support rails is located in alignment with and beneath compression rails 204 and 206. With the arrangement thus described, the springs 180–183 will compressively bias the upper conveyer compression rails against dies in contact with them which, in turn, are supported by the lower conveyer support slide rails. The latter rails also are formed of a UHMW plastic. FIG. 10 further shows that male die assembly 210' is being compressively biased toward female die assembly 208' and that these die assemblies, now positioned inwardly from boundary 318 are located such that their aligned trim receiving openings 214 and trim ejection openings 224 and 225 (FIG. 12) are located beneath spaced apart air nozzles 320 and 322. Air nozzle 320 additionally is aligned with the input of trim removal chute 68. A similar trim removal chute 70 is positioned on the opposite side of apparatus 10 and its intake is aligned with air nozzle 322. Thus, trim which will have been urged by compression into the trim receiving openings 214 will be driven by air into the trim meat collection facilities. As is apparent only one such trim chute may be employed which receives trim ejected by nozzles 320 and 322. The location of the nozzles 320 and 322 as well as die assembly 210' are revealed in FIG. 11.

Figure 13:
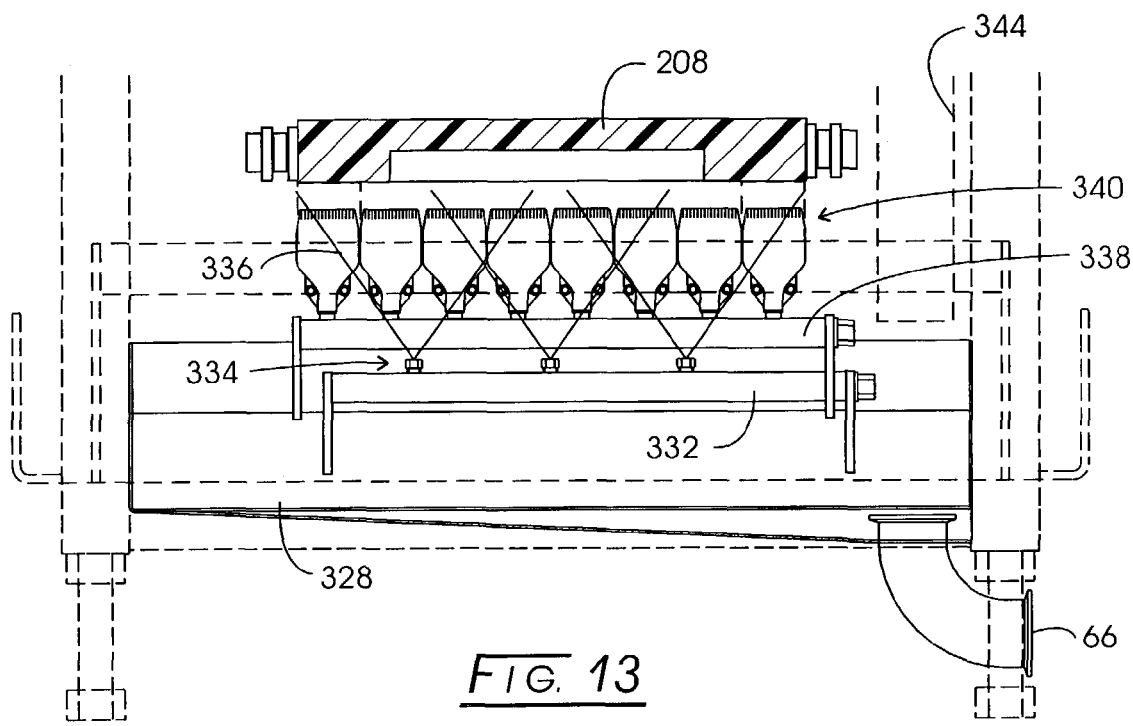
FIG. 13 is a partial left side view of the apparatus of the invention illustrating water and air jet components.

With the exception of the trim meat transferred from apparatus 10 via chutes 68 and 70, meat scrap eventually will be transferred into collection tray 88 as described in connection with FIG. 2. Returning to that figure, tray 88 is seen to be fed via sloping pans or trays identified at 328 and 330. Looking additionally to FIG. 13, positioned upon tray 328 is a water spray manifold 332 in combination with an array of water spray nozzles 334. Nozzles 334 pressure spray the inward surfaces or sides of female die assemblies 208 as they return to idler sprocket 90. That spray output is represented at 336. With the arrangement, scrap within the female die assemblies will be washed off and fall into the tray 328. Next along this return path of conveyer 96 is an air knife or manifold 338 which is combined with an array of pressurized air nozzles represented generally at 340. Nozzles 340 will function to remove scrap not removed by the water spray 336. As the female die assemblies move over idler sprocket 90, any debris on their outward side will be deposited within a catch tray 342 and dropped through tube 344 to sloping tray 328. Upper conveyer assembly 122 similarly is treated. In this regard, the inward faces of the returning male die assemblies are cleaned with a pressurized air spray from water spray manifold 346 as it is combined with an array of water spray nozzles 348. Following the water spray treatment, those die surfaces then are treated to high pressure air via air knife or manifold 350 as combined with an array of air nozzles 352. Meat debris on the outward sides of the male die assemblies is collected in a catch tray 354 and deposited upon collection tray 88 via tube 356. Materials and liquids thus collected at tray 88 are disposed of via liquid/scrap conduit 66.

Figure 14:
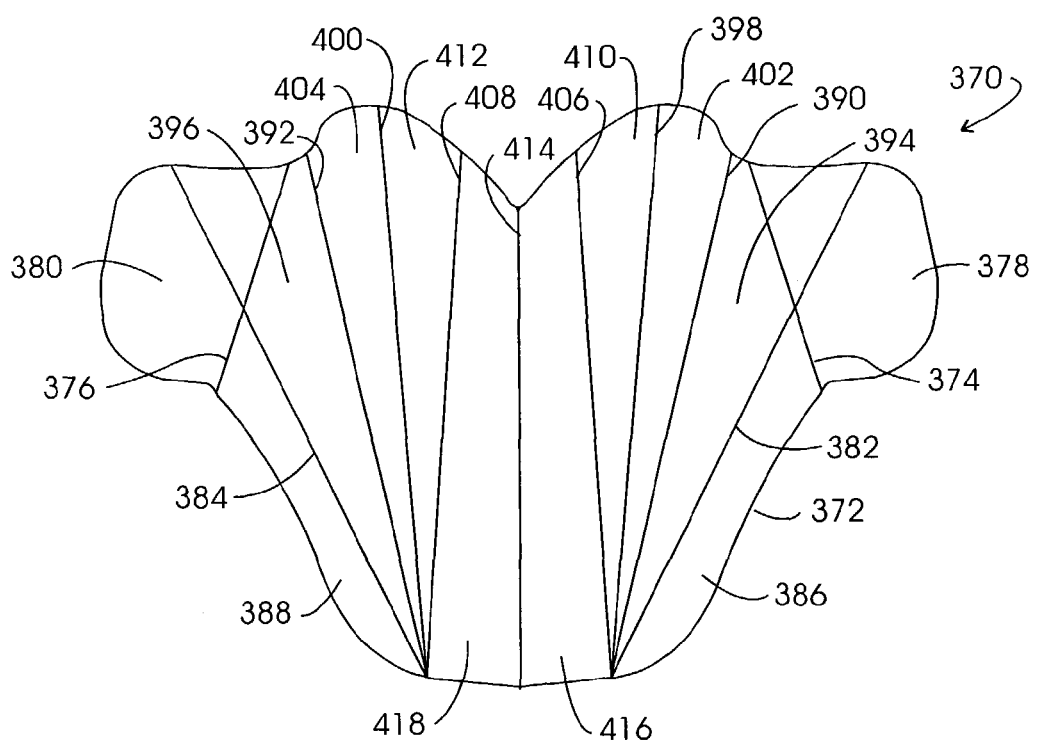
FIG. 14 is a schematic plan view of a meat component showing cut geometry.

For the instant embodiment or application, the controllably compressed breast components are cut with circular blades in a manner wherein the resultant meat product emulates a chicken tender. Referring to FIG. 14 a line profile of the compressed breast and the cuts that are made to derive the product as well as trim is illustrated. In the drawing, compressed breast meat 370 has been compressively flowed into the general profile represented at peripheral line 372. The produced meat product will be the result of a combination of cuts represented by lines. Cuts 374 and 376 are outboard and remove respective trim components 378 and 380. Cuts 382 and 384 produce respective products 386 and 388. Cuts 382 and 390 produce product 394, while cuts 384 and 392 produce product 396. Cuts 390 and 398 and cuts 392 and 400 produce respective products 402 and 404. Cuts 398 and 406 and cuts 400 and 408 produce respective products 410 and 412. Finally, cuts 406 and 414 and 408 and 414 produce respective products 416 and 418.

To carrying out the cutting pattern of FIG. 14, two cutting stages, an entrance and an exit stage are employed. The entrance cutting stage is represented in FIG. 2 in general at 430. This stage or station performs within the boundary described in connection with FIG. 11 at 316. An exit cutting stage or station is represented in general at 432. This stage performs within the boundary 318 described in connection with FIG. 11. Depending upon the cutting pattern desired, the number of these cutting stages can be increased or decreased to one. Stations 430–432 comprise vertically reciprocating carriage assemblies represented respectively at 434 and 436 which assume the neutral orientation represented in FIG. 2 at such time as the conveyors 96 and 122 are indexing through them with their associated die assemblies being urged together in compression to define a die. This neutral orientation reappears in enlarged fashion in FIG. 15. Looking to that figure, carriage assemblies 434 and 436 are seen to have an open box-like structure supporting upper and lower ganged slitter or cutting blades. While the side view illustration of these blades show them at their full diametric extent, these nine inch single point knife blades will assume any of a variety of angular orientations to the extent that they can perform in an orientation perpendicular to the line of travel of conveyers 96 and 122. The latter orientation will be employed, for example, in forming "nugget" (polyhedron) designated products. Referring additionally to FIG. 16, carriage assembly 434 is seen to support upper ganged blades represented generally at 438 and lower ganged blades represented generally at 440. The term "ganged" or "gang" as used herein is intended to mean one or more. However, blades in an upper or lower location may be deleted altogether in accordance with patterns of cuts to be made. Carriage 434 is supported by four frame mounted stainless steel standoff rods. The upper ones of these rods are seen in FIG. 16 at 442 and 443, while the lower standoff rods are shown at 444 and 445. Carriage positioning belt 254 is seen to extend over freely rotating idler sprocket 250 in FIGS. 16 and 17.

Figure 15:
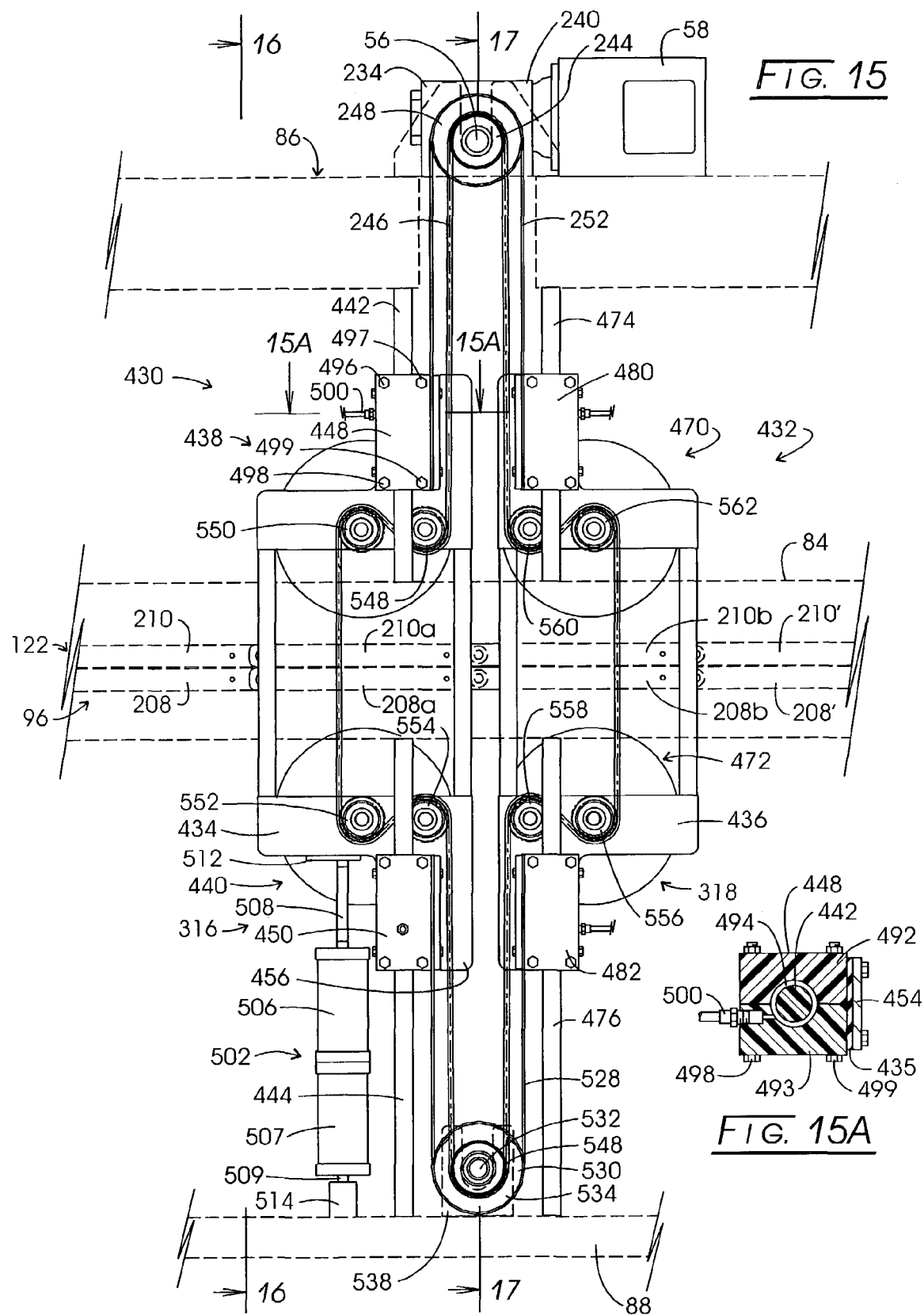
FIG. 15 is a partial side view of the apparatus of FIG. 2 showing two blade carriage assemblies in a neutral orientation.
Figure 16:
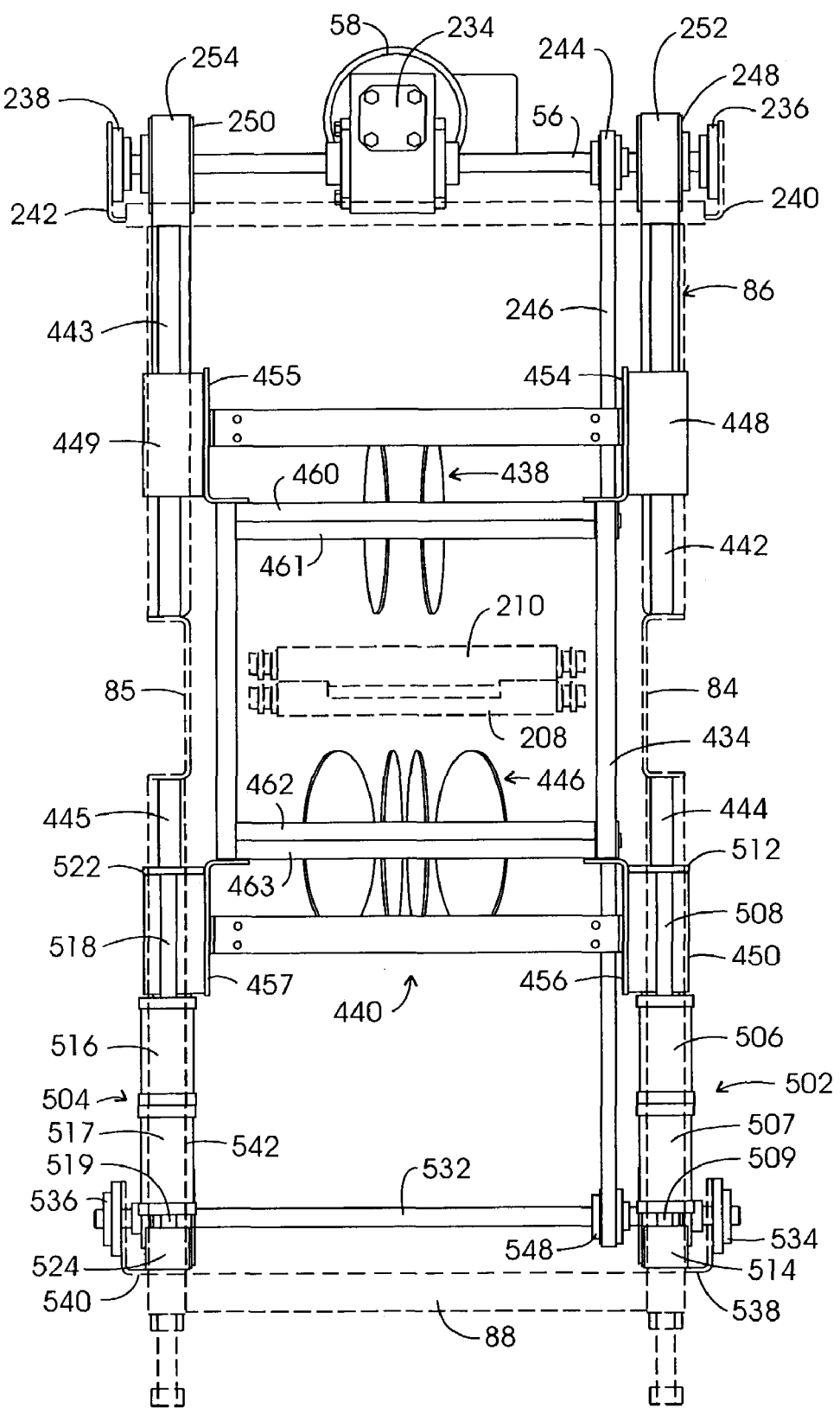
FIG. 16 is a sectional view taken through the plane 16—16 shown in FIG. 15.
Figure 17:
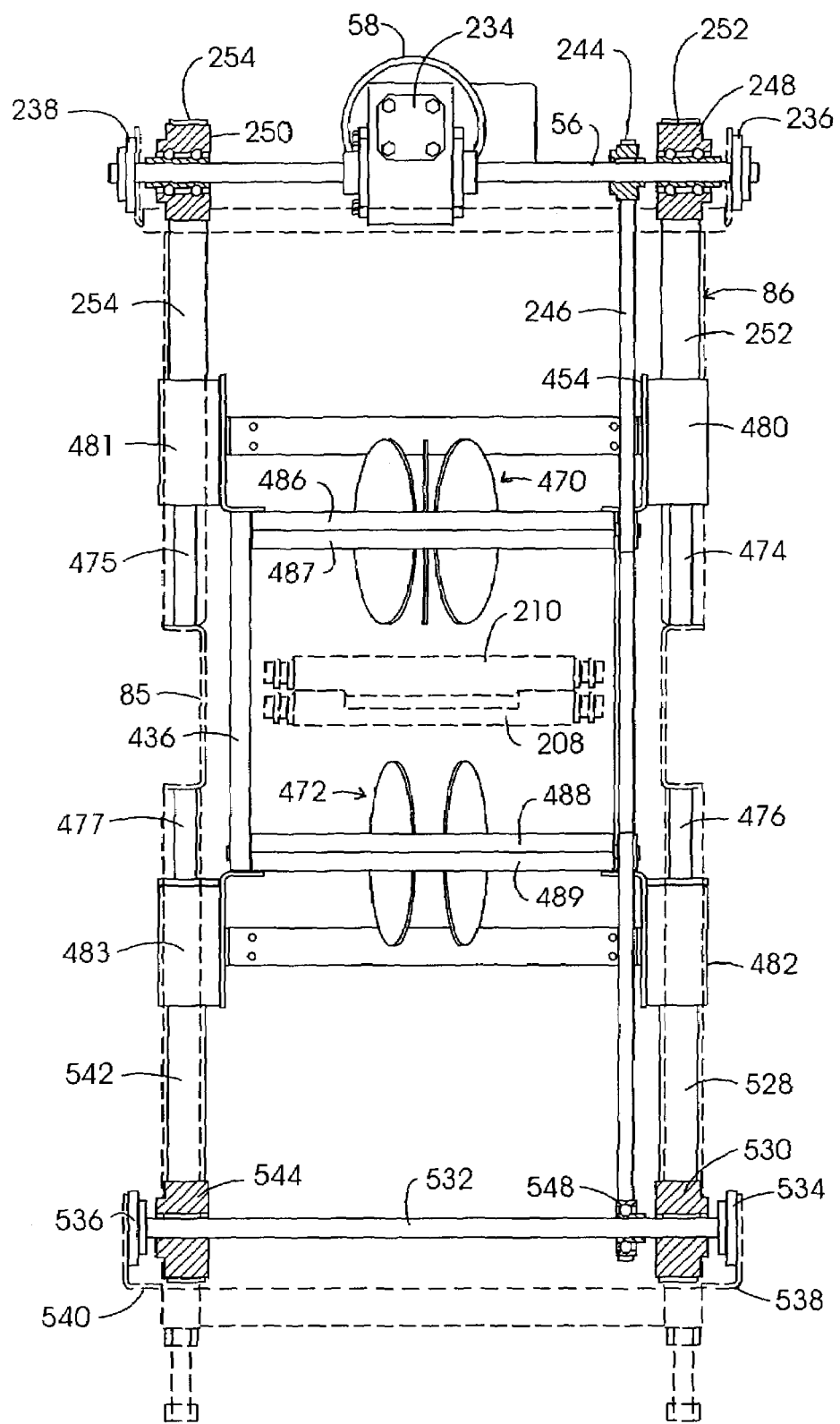
FIG. 17 is a sectional view taken through the plane 17—17 shown in FIG. 15.

FIGS. 15 and 17 illustrate a lower carriage positioning belt 528, the ends of which are attached to linear slide bushings 450 and 482 and which extends about a an idler sprocket 530. Sprocket 530 is mounted and fixed to shaft 532. FIGS. 6, 16 and 17 reveal that shaft 532 is mounted for rotation between oppositely disposed bearings 534 and 536 which, in turn, are mounted upon respective brackets 538 and 540 extending from the frame assembly.

An oppositely disposed lower carriage positioning belt 542 (FIGS. 16 and 17) extends about sprocket 544 (FIG. 17) mounted upon and fixed to shaft 532. Belt 542 is also configured as a timing belt and is coupled between linear slide bushing 451 (FIG. 16) and linear slide bushing 483 (FIG. 17).

With the arrangement of the carriage positioning timing belts, vertical motion imparted to carriage assembly 434 by the air cylinder assembly 502 in one direction will cause corresponding and equivalent motion in carriage 436 in an opposite direction.

Figs. as at 6, 16 and 17 reveal that driven drive shaft 56 functions to drive a sprocket 244 which, in turn, asserts drive upon blade drive timing belt 246. FIGS. 16 and 17 reveal that timing belt 246 extends, inter alia, about an idler sprocket 548 mounted for free rotation upon shaft 532. In contrast, idler sprockets 530 and 544 are tied to shaft 532 such that their rotative motion is coordinated.

Returning to FIG. 15, endless blade drive timing belt 246 is seen to extend from its driven connection with drive sprocket 244 to an upper tension adjusting idler sprocket 548. Sprocket 548 is mounted for rotation upon fixed shaft 607. From upper idler sprocket 548, belt 246 extends over blade drive sprocket 550 which functions to impart an articulated rotational drive to upper entrance blade gang 438. From drive sprocket 550, belt 246 extends to lower blade drive sprocket 552 which functions to impart rotational drive to ganged blades 440. From drive sprocket 552, belt 246 extends upwardly and over lower tension adjusting idler sprocket 554. From idler sprocket 554, belt 246 extends about freely rotatable idler sprocket 548 (FIGS. 16, 17). Upon passing around idler sprocket 548 belt 246 extends upwardly over lower blade drive sprocket 558 mounted upon carriage assembly 436 for imparting drive to ganged blades 472. Upon passing over drive sprocket 558, belt 246 extends about lower blade idler sprocket 556 also attached to exit carriage assembly 436. Belt 246 then extends upwardly for engagement with upper idler sprocket 562. From idler sprocket 562, belt 246 extends about upper blade drive sprocket 560 to impart drive to ganged blades 470 whereupon the endless timing belt again extends about drive sprocket 244. With the arrangement shown, belt 246 will impart drive to all of the ganged blades notwithstanding the orientations which carriage assemblies 434 and 436 assume in connection with meat product production.

Now considering those orientations, FIG. 15 shows a neutral orientation of carriages 434 and 436 wherein their associated gangs of blades are not in contact with the die assemblies. In this regard, it may be assumed that male die assembly 210*a* and female die assembly 208*a* defining a combined die have been indexed into the position shown in preparation for cutting activity from carriage 434. Correspondingly, male die assembly 210*b* and female die assembly 208*b* retain meat product in compression and have been indexed from slot alignment with the ganged blades of carriage 434 into alignment now with the ganged blades of carriage 436.

Figure 18:
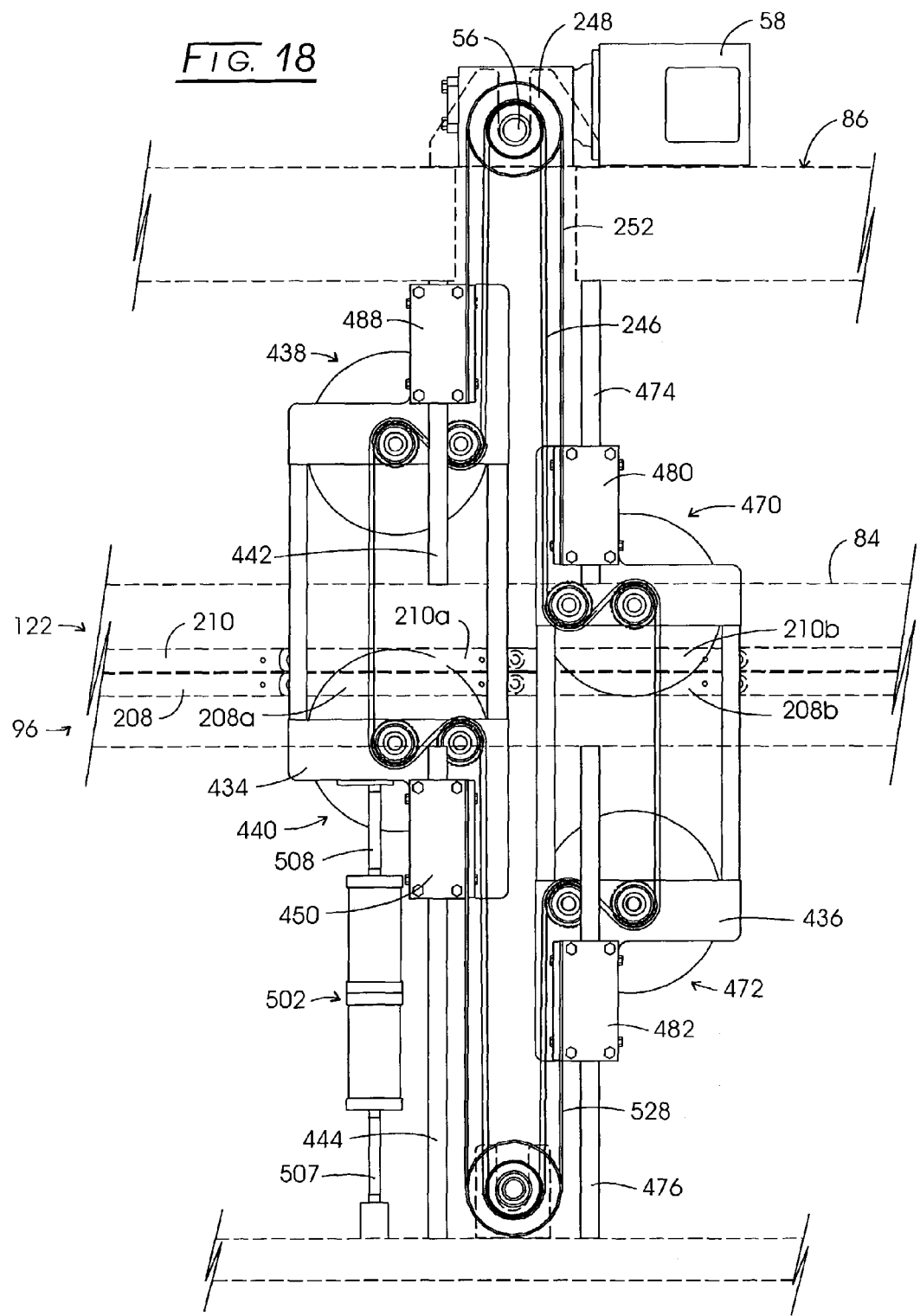
FIG. 18 illustrates the components shown in FIG. 15 but in a carriage assembly configuration wherein the entrance carriage is elevated and the exit carriage is lowered.

Turning to FIG. 18, while drive is imparted from timing belt 246 to all ganged blades, air cylinder assemblies 502 and 504 will have been actuated into an orientation wherein the drive rods, for example at 507 and 508 in connection with air cylinders 502 are fully extended. As this action occurs, carriage 434 slides upwardly as its four associated linear slide bushings slide upwardly on their appropriate upper and lower standoff rods. Because of the interconnection of carriage assembly 434 with carriage assembly 436 via the upper and lower carriage positioning belts as seen in the instant figure at 252 and 528, carriage 436 is driven downwardly as its appropriate linear slide bushings slide downwardly over their appropriate upper and lower standoff rods. In the figure bushing 480 is seen to have slid downwardly on upper standoff rod 474 and bushing 482 is seen to have slid downwardly on its associated lower standoff rod 476. With this simultaneous motion blade gang 440 is maneuvered through slots formed within female die assembly 208*a* from the outward side thereof and into male die assembly 210*a* from its inward side. Simultaneously, ganged blades 470 of carriage assembly 436 will move downwardly through the outward side of male die assembly 210*b* and thence into female die assembly 208*b* from its inward side. When these die assemblies 208*a* and 210*a* and 208*b* and 210*b* are in the orientation shown, their slots are mutually aligned.

Figure 19:
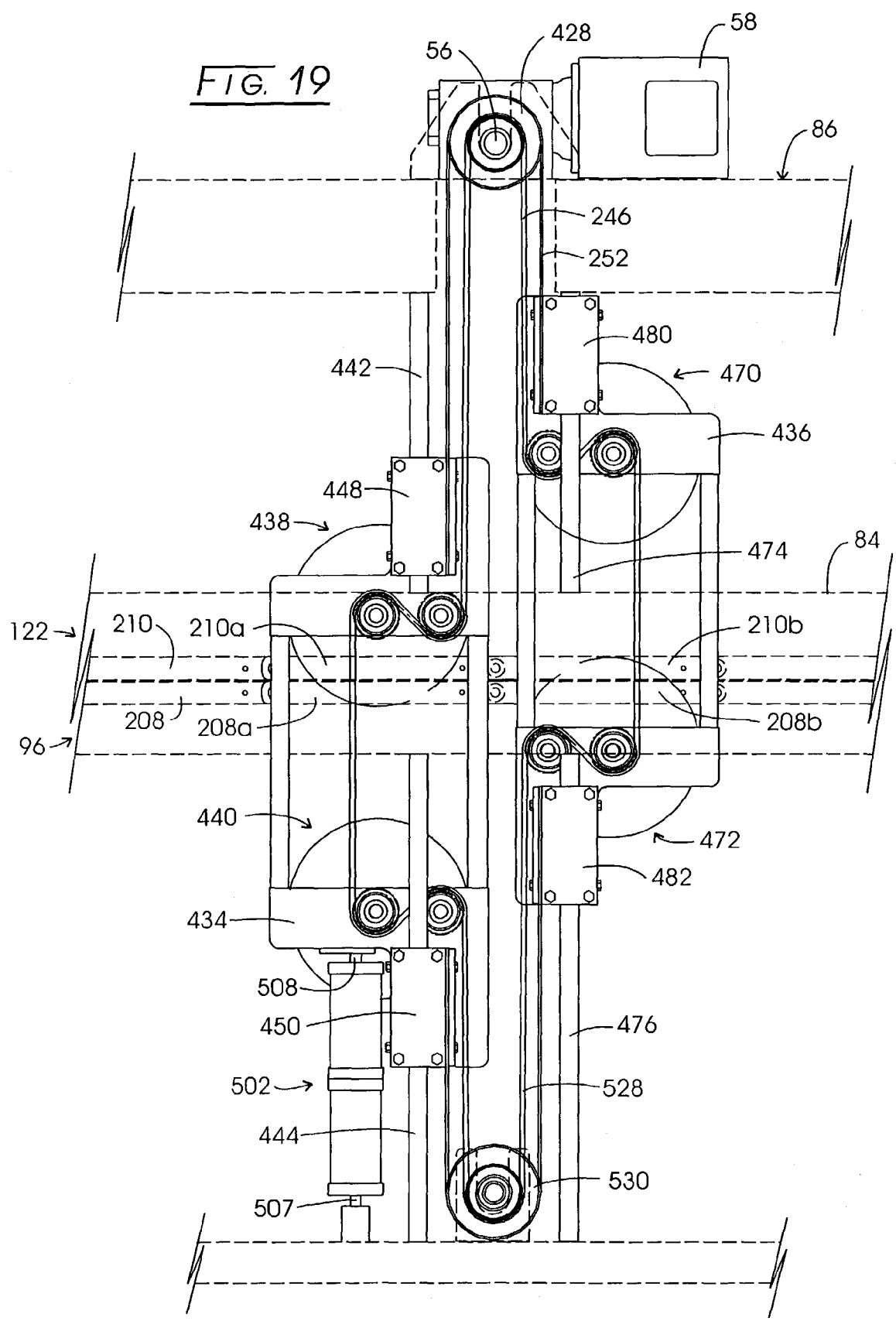
FIG. 19 is a view of the carriage assemblies shown in FIG. 15 but with the entrance carriage assembly being shown in a lowered position and the exit carriage assembly being shown in an elevated orientation.

Looking now to FIG. 19, air cylinder assemblies 502 and 504 are actuated to retract their associated drive rods, for example, drive rods 507 and 508*of* air cylinder assembly 502 are seen to be retracted. With this action, carriage assembly 434 is drawn downwardly, its linear slide bushings moving downwardly on their associated standoff rods. For instance, seen in the figure, slide bushing 448 has slid downwardly on upper standoff rod 442 and slide bushing 450 has moved downwardly on its associated lower standoff rod 444. As a consequence of the carriage positioning belt couplings between carriages 434 and 436, carriage 436 will be moved upwardly, its associated linear slide bushings sliding upwardly on their appropriate standoff rods. For example, in the instant figure slide bushing 480 is seen to have slid upwardly on its associated upper standoff rod 474 and slide bushing 482 is seen to have slid upwardly on its associated lower standoff rod 476. With this action, the upper gang of blades 438 on carriage assembly 434 will have moved through the outward side of male die assembly 210*a* and into the aligned slots of female die assembly 208*a* through its inward side. Simultaneously, the lower gang of blades 472 carried by carriage assembly 436 will have moved upwardly through the aligned slots at the outward side of female die assembly 208*b* and into the slots in alignment at male die assembly 210*b* through its inward side.

Air cylinder assemblies 502 and 504 are then actuated to return carriages 434 and 436 to the neutral orientation shown in connection with FIG. 15. As this orientation is obtained, conveyer assemblies 96 and 122 are indexed to position the die represented by combined die assemblies 210a and 208a to the cutting station represented by carriage assembly 436. Conjoined die assemblies 208b and 210b simultaneously are maneuvered to the orientation earlier-described at 208' and 210' where trim meat is driven by air nozzles 320 and 322 into collecting chutes 68 and 70 (FIG. 10). Throughout this cutting procedure conveyer assemblies 96 and 122 retain the meat components which they carry in compression throughout the compression region discussed above in connection with FIGS. 10 and 11.

Figure 20:
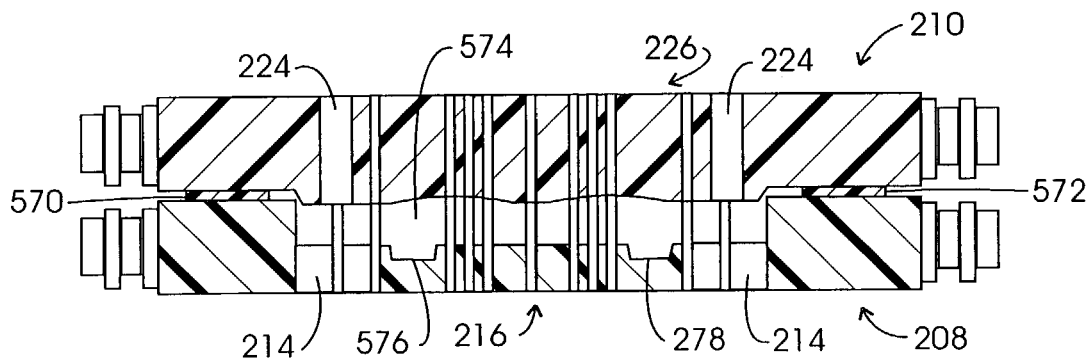
FIG. 20 is a schematic sectional view of oppositely disposed and aligned male and female die assemblies with spacers interposed between them.
Figure 21:
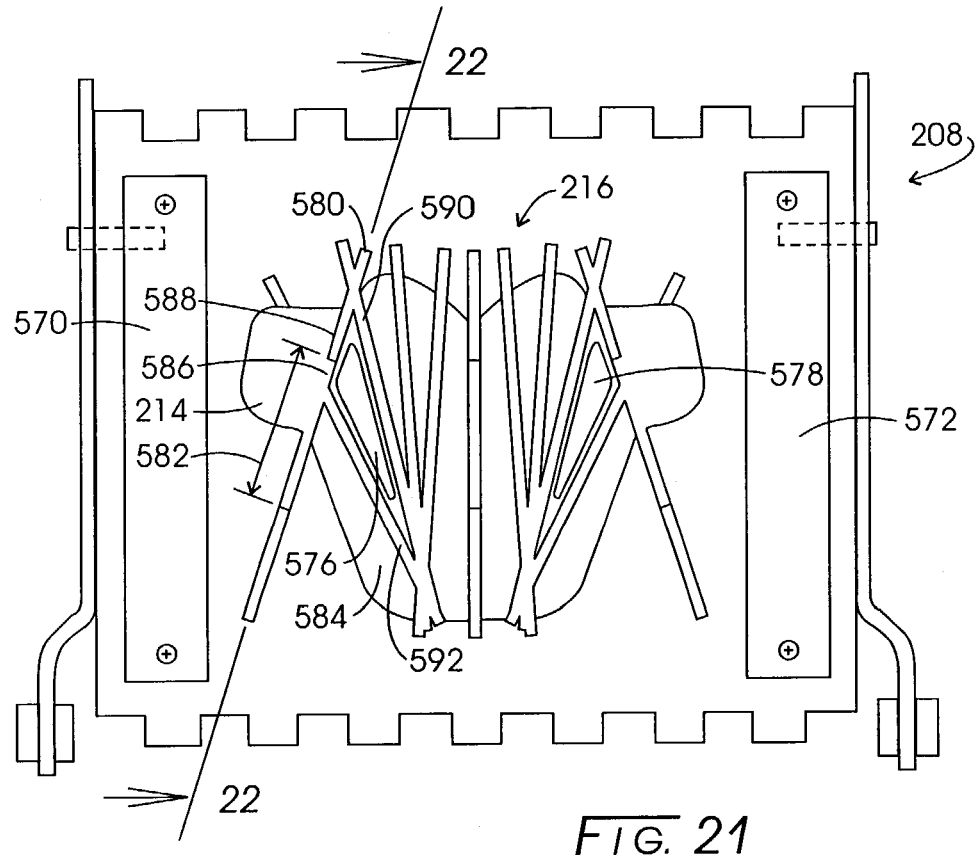
FIG. 21 is a top view of a female die assembly illustrated in FIG. 20.
Figure 22:
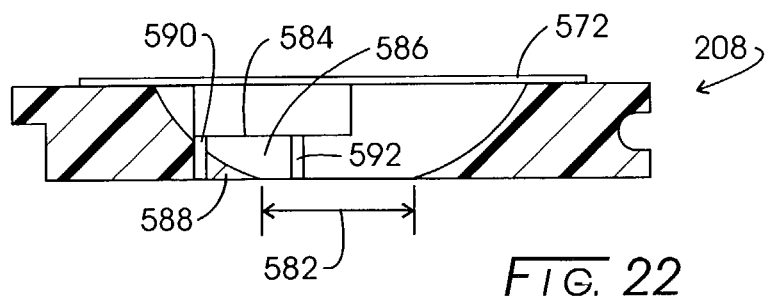
FIG. 22 is a sectional view taken through the plane 22—22 shown in FIG. 21.

Because all meat severing is carried out utilizing discrete rotating knives or blades, adjustment of the weight of a given meat product can be made with apparatus 10 with considerable facility. Referring to FIG. 20 a female die 208 and aligned male die 210 are schematically portrayed in sectional fashion. The figure reveals that increases in meat product piece part weight can be achieved without carrying out extensive retooling. One approach to this adjustment of piece part weight is the incorporation of flat spacers with one or the other of the dies 208 or 210. Such spacers are shown in the figure at 570 and 572. While two such spacers are shown, only one may be utilized to emphasize weight at one side of the die cavity now represented at 574. Where a specific meat product component requires additional weight, the female die may be machined to provide flat indentations as represented at 576 and 578. Spacers 570 and 572 as well as indentations 576 and 578 also appear in plan view form in FIG. 21. That figure also shows a section line 22—22 in association with an outboard slot 580. Slot 580 is configured such that a circular cutting blade will enter die assembly 208 through its inward side, having traversed the corresponding male die assembly. The blade will pass through die assembly 208 to the extent represented by arrows 582. Looking additionally to FIG. 22, arrows 582 reappear in a sectional representation. Cavity surface 584 identified in FIG. 21 also appears in FIG. 22. An inward wall identified at 586 in FIG. 21 is seen with that numeration in FIG. 22. Within that inward wall 586 is a triangular shaped plastic component 588 also seen in both FIGS. 21 and 22. That arrangement demonstrates that even though the blade receiving slots intersect each other the die assembly retains its structural integrity to the extent that pieces will not fall out. Blade receiving slots 590 and 592 also are commonly identified in FIGS. 21 and 22.

Figure 23:
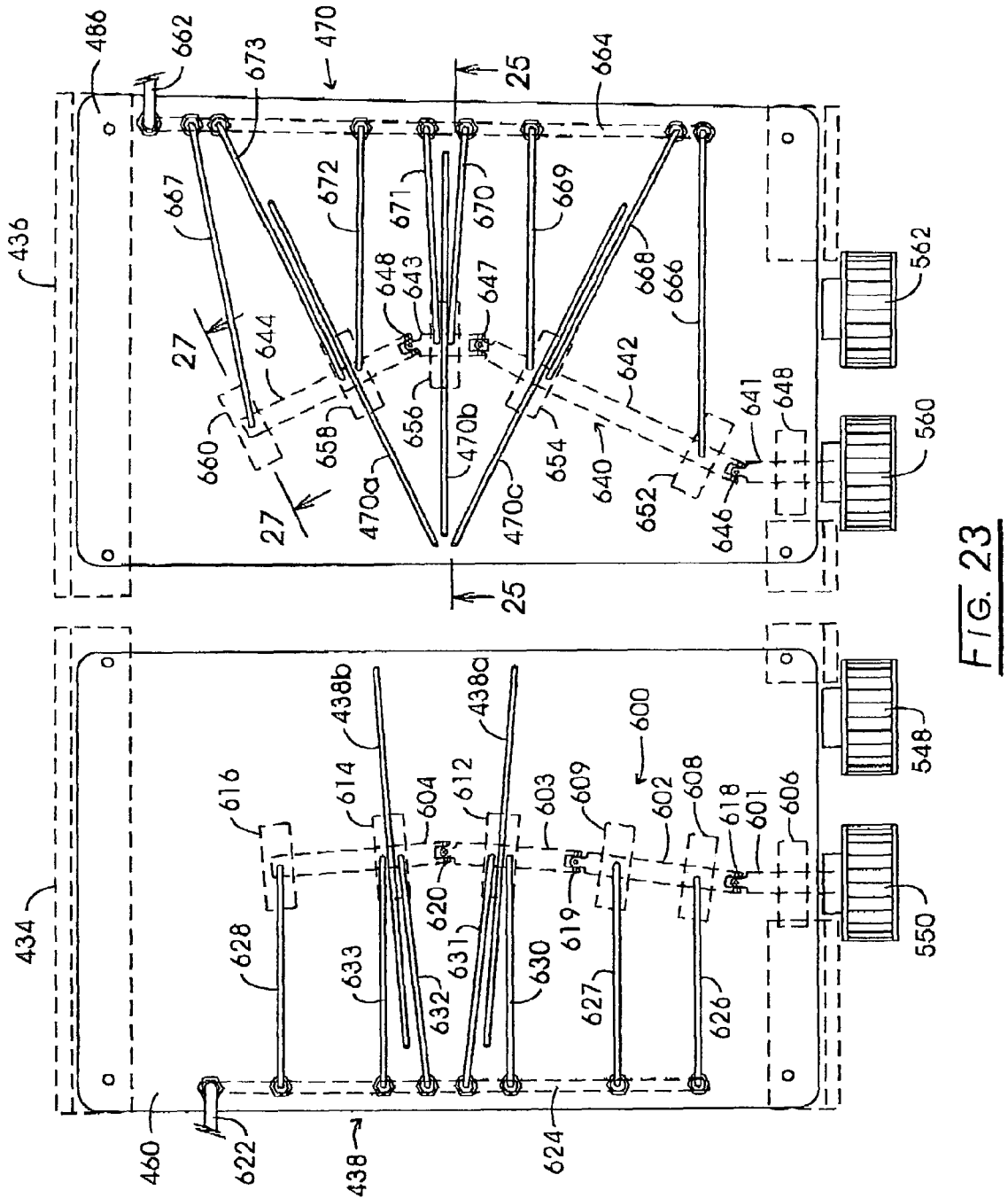
FIG. 23 is a top view of blade support and drive assemblies for the upwardly disposed blades of the carriages shown in FIG. 15.

The circular cutting blades employed with apparatus 10 may assume essentially any angular orientation with respect to the direction of travel of conveyer assemblies 96 and 122. Looking to FIG. 23 the blade mounting and drive approach of the invention is revealed. FIG. 23 is a view of the uppermost blade mount assembly incorporated with carriages assemblies 434 and 436. In this regard, it may be recalled from FIG. 16 that entrance blade mount assembly is comprised of two sandwiched together or conjoined blade mount plates 460 and 461, plate 460 appearing in the figure. Similarly, as described in connection with FIG. 17, the upper blade mount assembly of carriage 436 has been described as comprising blade mount plates 486 and 487, mount plate 486 appearing in the instant figure. These blade mount plates are formed of UHMW plastic. Drive to the variously angled cutting blades is provided by articulated stainless steel drive shafts each having a square cross section. In this regard, it may be observed that drive sprocket 550 imparts rotational drive to stainless steel drive shaft 600. Shaft 600 is seen to have a first component 601 extending to a grouping of angularly oriented shaft components 602–604. Drive sprocket 550 is supported by carriage 434 and associated shaft 601 is supported from bearing 606. An idler sprocket 548 also is connected to carriage assembly 434. Both sprockets 550 and 548 are capable of performing as either an idler or a driver depending on whether or not a shaft is inserted into the sprocket. If desired, for example, when utilizing a different blade mount assembly, a shaft could be inserted into sprocket 548 so that sprocket 548 functions as a driver rather than an idler. Shaft component 602 is supported from dual plastic water lubricated bearings 608 and 609. Shaft component 603 is coupled with a blade hub assembly 612 supporting circular blade 438a of ganged blades 438. Shaft component 604 drivably supports blade 438b at a blade hub assembly 614 and further extends to an idler bearing 616. Shaft components 601–604 are seen to be interconnected with universal joints or U-joints 618–620.

Bearings 608, 609, and 616 as well as hub assemblies 612–614 are formed of a combination of UHMW and "Delrin" plastics which are lubricated with water under pressure. In this regard, water delivery polypropylene tubing 622 is seen to direct water under pressure to an internally disposed water manifold 624. Water is conveyed to bearings 608, 609 and 616 from manifold 624 via respective nipple coupled polypropylene water tubes 626–628. In similar fashion, water under pressure is conveyed from manifold 624 to hub assembly 612 via polypropylene tubes 630 and 631 which extend on either side of blade 438a. In similar fashion, nipple connected polypropylene tubes 632 and 633 extend from manifold 624 to hub assembly 614 at each side of blade 438b.

Looking to carriage assembly 436 and blade mount plate 486, blade drive sprocket 560 is seen coupled in driving relationship with a drive shaft 640 formed of stainless steel having a square cross section. Drive shaft 640 is formed with articulated components 641–644 which are interconnected with U-joints 646–648. Drive sprocket 560 is coupled in driving relationship with shaft component 641 which, in turn, is supported from bearing 648. An adjacent idler sprocket, 562, is connected to carriage assembly 436. Sprockets 560 and 562, as with sprockets 550 and 548, are both capable of functioning as either a drive sprocket or an idler sprocket. Shaft component 642 is supported by a water lubricated dual plastic bearing 652 and blade hub assembly 654. Hub assembly 654 is coupled in driven relationship with circular blade 470c of blade gang grouping 470. Drive shaft component 643 is coupled with blade 470b at blade hub assembly 656. Drive shaft component 644 is connected in driving relationship with blade hub assembly 658 which in turn, is coupled in driving relationship with circular cutting blade 470a. The end of drive shaft component 644 is supported at dual plastic water lubricated bearing 660. Lubricating water under pressure is supplied to the bearing and hub assemblies from polypropylene tubing 662 which extends to a manifold 664. Lubricating water under pressure is delivered to dual plastic bearings 652 and 660 via nipple connected polypropylene tubes shown respectively at 666 and 667. Lubricating water under pressure is delivered from manifold 664 to hub assembly 654 via polypropylene tubes 668 and 669; to hub assembly 656 via nipple connected polypropylene tubes 670 and 671; and to hub assembly 658 via nippled polypropylene tubes 672 and 673.

Figure 24:
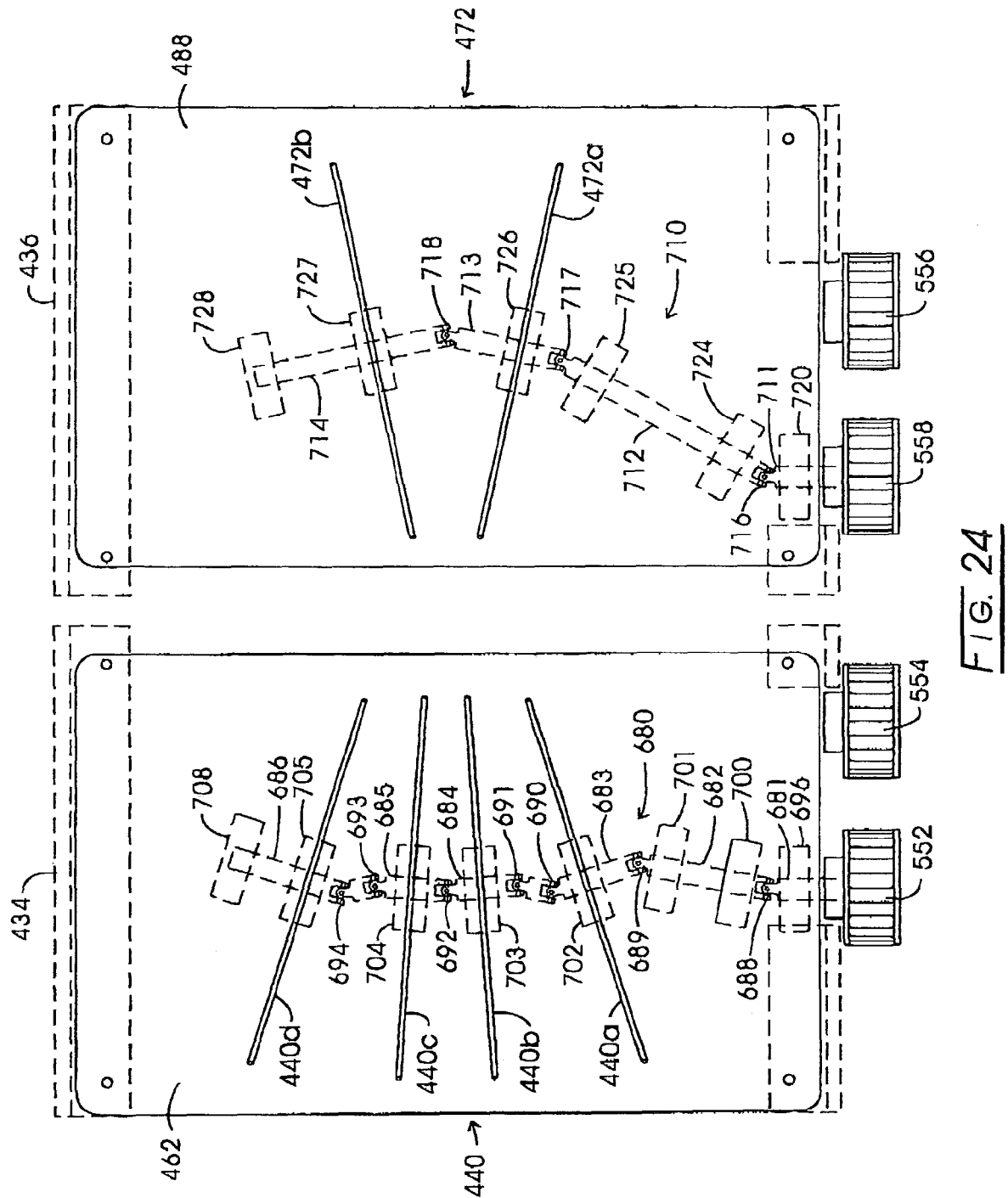
FIG. 24 is a top view of the lower blade support assemblies of the carriage assemblies shown in FIG. 15.

Turning to FIG. 24, top views of the lower blade support assemblies for carriages 434 and 436 are presented. As described in connection with FIG. 16, the lower blade support assembly is formed of mated or sandwiched together blade mount plates 462 and 463; while, as revealed in connection with FIG. 17, the lower blade support assembly for carriage 436 is formed with blade mount plates 488 and 489. Looking to carriage assembly 434, drive sprocket 552 is seen coupled to an articulated stainless steel drive shaft represented generally at 680. Drive shaft 680 is configured having a square cross section and is formed of drive shaft components 681–686. Those components are interconnected with universal joints or U-joints 688–694. Drive sprocket 552 is coupled to drive shaft component 681 and is supported from bearing 696. Idler sprocket 554 is supported from bearing 698. Drive shaft component 682 is supported between dual plastic water lubricated bearings 700 and 701. Drive shaft component 683 is coupled in driving relationship with circular blade 440a via a dual plastic water lubricated hub assembly 702. Circular blade 440b is shown to be in driven relationship with shaft component 684 which, in turn, is coupled with dual plastic water lubricated hub assembly 703. Drive shaft component 685 is coupled in driving relationship with blade 440c via dual plastic water lubricated hub assembly 704. Drive shaft component 686 is coupled in driving relationship with circular blade 440d via dual plastic water lubricated hub assembly 705 and further is supported from outboard dual plastic water lubricated bearing 708. While not shown in the interest of clarity, a water supply arrangement with manifold and delivery tubes is provided in substantially the same manner as described in connection with FIG. 23.

Looking to the lower blade support assembly of carriage 436, as described in connection with FIG. 17 that assembly is formed with two sandwiched together blade mount plates 488 and 489. Drive sprocket 558 is shown coupled in driving relationship with a stainless steel drive shaft represented generally at 710. Drive shaft 710 is configured having a square cross-section and is formed of articulated drive shaft components 711–714. Drive shaft components 711–714 are interconnected by universal joints or U-joints 716–718. Drive is imparted to drive shaft 710 from blade drive sprocket 558 which is connected to drive shaft component 711 and supported from a bearing 720. Idler sprocket 556 is supported from bearing 722. Drive shaft component 712 is seen supported by spaced apart, dual plastic, water lubricated bearings 724 and 725; drive shaft component 713 is coupled in driving relationship with circular knife blade 472a via a dual plastic, water lubricated hub assembly 726; and drive shaft component 714 is coupled in driving relationship with circular cutting blade 472b via dual plastic, water lubricated hub assembly 727. Finally, the opposite side of drive shaft component 714 is supported by a dual plastic, water lubricated bearing 728. Water lubrication is supplied to bearings 724, 725 and 728 as well as hub assemblies 726 and 727 in the manifold based manor described in connection with FIG. 23.

Referring to FIG. 25, a section identified in FIG. 23 is presented for purpose of illustrating the structuring of the blade supporting hub assemblies, for example, that shown at 656. Looking additionally to FIG. 26, hub 656 is incorporated within conjoined blade mount plates 486 and 487 and is formed having two blade hub caps 730 and 732 positioned at opposite sides of circular blade 470b. Caps 730 and 732 are formed of UHMW plastic and incorporate lubricating water nipples shown respectively at 734 and 736 connecting with respective water supply tubes 670 and 671. Within the cavity established by caps 730 and 732 are blade hub bases 738 and 740 which are positioned on opposite sides of blade 470b. Formed of "Delrin" plastic, these hub bases are pinned together through blade 470b by two stainless steel pins 742 and 744. With the arrangement shown, a very low friction mounting of blades as at 470b is achieved.

Referring to FIGS. 27 and 28, the structure of a dual plastic, water lubricated bearing as described at 660 in FIG. 23 is illustrated. Bearing 660 is formed with an outer component or cap 746 having an interior cavity 748 and formed of UHMW plastic. The nipple 750 communicates that cavity 748 with lubricating water under pressure at tube 667. A bearing base 752 extends about drive shaft component 644 and is rotatable within cavity 748. Base 752 may be formed of "Delrin". With the dual plastic water lubricated arrangement, these bearings as at 660 exhibit very low friction attributes.

Since certain changes may be made in the above-described apparatus and method without departing from the scope of the invention herein involved, it is intended that all matter contained in the description thereof or shown in the accompanying drawings shall be interpreted as illustrative and not in a limited sense.

The invention claimed is:

1. Apparatus for forming a shaped meat product from a meat component of given peripheral and volumetric shape, comprising:

a female die assembly with an outward side and an inward side with one or more cavities having inwardly disposed peripheral wall portions and having slots defining said meat product shape with said peripheral wall portions, first ones of said slots being configured for receiving a meat cutting blade from said outward side, and second ones of said slots being configured for receiving a meat cutting blade at said inward side;

a male die assembly with an outward side and an inward side, having slots defining said meat product shape, third ones of said slots being configured for receiving a meat cutting blade from said outward side and corresponding with said second ones of said slots, and forth ones of said slots being configured for receiving a meat cutting blade from said inward side and corresponding with said first ones of said slots;

a die transport assembly actuable to move said female die assembly into a loading station at which a said meat component is received upon said one or more cavities; subsequently actuable to move said female die assembly and said male die assembly into die defining mutual registry generally urging said meat component into adjacency with said peripheral wall portions; actuable to move said die to a cutting region; and actuable to separate said female die assembly and said male die assembly at an exit region;

a first blade mount assembly at said cutting region moveable between one or more first non-cutting position and a first cutting position adjacent a said female die assembly located at said cutting region;

one or more dynamically actuable first blades supported by said first blade mount assembly and movable therewith to said first cutting position wherein said first blades move into cutting relationship with a said meat component from said female die assembly outward side through said first and fourth ones of said slots, and further movable therewith into a said first non-cutting position removing said first blades from said first and fourth ones of said slots;

a second blade mount assembly at said cutting region moveable between one or more second non-cutting positions and a second cutting position adjacent said male die assembly located at said cutting region;

one or more dynamically actuable second blades supported by said second blade mount assembly and moveable therewith to said second cutting position and wherein said second blades move into cutting relationship with said meat component from said male die assembly outward side through said second and third ones of said slots, and further moveable therewith into a said second non-cutting position removing said second blades out of said second and third ones of said slots;

a transport actuator configured to actuate said die transport assembly;

a blade mount positioning actuator configured to effect said movement of said first and second blade mount assemblies; and a blade drive actuator configured to actuate said first and second blades.

2. The apparatus of claim 1 in which:
said one or more first blades are circular disc blades; and
said first blade mount assembly comprises a first drive shaft coupled in driving relationship with said one or more first blades and driven relationship with said blade drive actuator.

3. The apparatus of claim 2 in which:
said die transport assembly is actuable to move said die along a given locus of travel;
one said one or more first blades is angularly oriented with respect to said locus of travel; and
said drive shaft comprises articulated drive shaft components.

4. The apparatus of claim 2 in which:
said drive shaft is mounted upon one or more water lubricated bearings mounted upon said first blade mount assembly and having first and second components formed of plastics exhibiting different hardness characteristics.

5. The apparatus of claim 4 in which:
said first component is formed of ultra high molecular weight polyethylene; and
said second component is formed of a linear polyoxymethylene-type acetal resin.

6. The apparatus of claim 2 in which:
said one or more first blades are coupled to said first drive shaft with water lubricated hub assemblies having a base assembly coupled and rotatable with said first blade and said drive shaft and an outwardly disposed bearing defining cap assembly surmounting said base assembly and mounted upon said first blade mount assembly, said base and cap assemblies being formed of plastics exhibiting different hardness characteristics.

7. The apparatus of claim 6 in which:
one said plastic is an ultra high molecular weight polyethylene; and
one said plastic is a linear polyoxymethylene-type acetal resin.

8. The apparatus of claim 1 in which:
said one or more second blades are circular disc blades; and
said second blade mount assembly comprises a second drive shaft coupled in driving relationship with said one or more second blades and driven relationship with said blade drive actuator.

9. The apparatus of claim 8 in which:
said die transport assembly is actuable to move said die along a given locus of travel;
one said one or more second blades is angularly oriented with respect to said locus of travel; and
said drive shaft comprises articulated drive shaft component.

10. The apparatus of claim 8 in which:
said drive shaft is mounted upon one or more water lubricated bearings mounted upon said second blade mount assembly and having first and second components formed of plastics exhibiting different hardness characteristics.

11. The apparatus of claim 10 in which:
said first component is formed of ultra high molecular weight polyethylene; and
said second component is formed of a linear polyoxymethylene-type acetal resin.

12. The apparatus of claim 8 in which:
said one or more second blades are coupled to said second drive shaft with water lubricated hub assemblies having a base assembly coupled and rotatable with said second blade and said drive shaft and an outwardly disposed bearing defining cap assembly surmounting said base assembly and mounted upon said second blade mount assembly, said base and cap assemblies being formed of plastics exhibiting different hardness characteristics.

13. The apparatus of claim 1 in which:
said die transport assembly is configured to compress said male and female die assemblies together when at said cutting region while substantially maintaining the integrity of the tissue structure of said meat component.

14. The apparatus of claim 1 further comprising:
a first carriage assembly located at said cutting region and configured to support said first blade mount assembly on one side of said die and to support said second blade mount assembly on a side of said die opposite said one side; and
said blade mount positioning actuator comprises a carriage actuator assembly coupled with said first carriage assembly and controllable to locate said first carriage assembly at a first neutral carriage position effective to derive a said first and second blade mount assembly respective first and second non-cutting positions, further controllable to locate said first carriage assembly at a first carriage cutting position effective to derive said first blade mount assembly first cutting position and a non-cutting position of said second blade mount assembly, and controllable to locate said first carriage assembly at a second carriage cutting position effective to derive said second blade mount assembly second cutting position and a non-cutting position of said first blade mount assembly.

15. The apparatus of claim 14 further comprising:
a first carriage support rod assembly having an outwardly disposed support surface;
one or more water lubricated first linear slide bearings having a bearing surface slideably mounted upon said outwardly disposed support surface and fixed to said first carriage surface, said support surface and said bearing surface being formed of plastics exhibiting different hardness characteristics.

16. The apparatus of claim 15 in which:
one said plastic is an ultra high molecular weight polyethylene; and
one said plastic is a linear polyoxymethylene-type acetal resin.

17. The apparatus of claim 1 further comprising:
a third blade mount assembly at said cutting region moveable between one or more third non-cutting positions and a third cutting position adjacent a female die assembly located at said cutting region;
one or more dynamically actuable third blades supported by said third blade mount assembly and moveable therewith to said third cutting position wherein said third blades move into cutting relationship with a said meat component from said female die assembly outward side through said first and fourth ones of said slots and further movable therewith into a said third non-cutting position removing said third blades from said first and fourth ones of said slots;

a fourth blade mount assembly at said cutting region moveable between one or more fourth non-cutting positions and a fourth cutting position adjacent said male die assembly located at said cutting region;

one or more dynamically actuable fourth blades supported by said fourth blade mount assembly and moveable therewith to said fourth cutting position and wherein said fourth blades move into cutting relationship with said, meat component from said male die assembly outward side through said second and third ones of said slots, and further moveable therewith into a said non-cutting position removing said fourth blades from said second and third ones of said slots;

a second carriage assembly located at said cutting region and configured to support said third blade mount assembly on one side of said die and to support said fourth blade mount assembly on a side of said die opposite said one side; and said blade mount positioning actuator is configured to locate said second carriage assembly at a second neutral carriage position effective to derive a said third and fourth blade mount assembly respective third and fourth non-cutting position, to locate said second carriage assembly at a third carriage cutting position effective to derive said third blade mount assembly third cutting position and a non-cutting position of said fourth blade mount assembly, and to locate said second carriage assembly at a fourth carriage cutting position effective to derive said fourth blade mount assembly fourth cutting position and a non-cutting position of said third blade mount assembly.

18. The apparatus of claim 17 further comprising;
a first carriage support rod assembly;
a second carriage support rod assembly;
and wherein:
said first carriage assembly is slideably mounted for movement upon said first carriage support rod assembly;
said second carriage assembly is slideably mounted for movement upon said second carriage support rod assembly; and
said blade mount positioning actuator configuration to locate said second carriage assembly at said second neutral carriage position, said third carriage cutting position, and said fourth carriage cutting position comprises an interconnector assembly in driven connection with said first carriage assembly and in driving connection with said second carriage assembly.

19. The apparatus of claim 18 in which said interconnector assembly comprises two or more belt and idler sprocket assemblies configured to derive mutually oppositely directed movement of said second carriage assembly with respect to said first carriage assembly.

20. The apparatus of claim 1 in which:
said one or more first and second blades are circular blades;
said first blade mount assembly comprises a first drive shaft coupled in driving relationship with said one or more first blades;
said second blade mount assembly comprises a second drive shaft coupled in driving relationship with said one or more second blades; and
said blade drive actuator comprises a motor having a drive output and an endless belt mounted in driven relationship with said drive output and in driving relationship with said first and second drive shafts.

21. The apparatus of claim 1 in which:
said meat component is a poultry breast of given peripheral profile, having a head region of given general thickness with a forward peripheral region and tapering to a tail region of general thickness less than said given thickness;
said one or more cavities of said female die assembly exhibit a depth for receiving a said breast;
said inwardly disposed peripheral wall portions exhibit a profile generally emulating the said given peripheral profile of said breast;
said female die assembly further comprises a trim removal opening located to be adjacent each oppositely disposed said breast forward peripheral region;
said slots comprise oppositely disposed outboard slots each configured as at least one said first ones of said slots and said second ones of said slots located adjacent each said trim removal opening at positions permitting a severance of meat within each said trim removal opening.

22. The apparatus of claim 21 in which said male die assembly further comprises:
a protruding male die member having a male wall extending from said inward side to define a compression surface having a wall defined peripheral shape generally corresponding with and nestable within said female die assembly cavities, said compression surface having a forward region compressibly contactable with said breast head region and ramping outwardly from said head region toward a rearwardly disposed region compressibly contactable with said breast tail region;
said compression surface being configured as effective to compressibly induce a flow of tissue of said breast into general abutment with said female die assembly inwardly disposed peripheral wall portions when said female die assembly and said male die assembly are moved into die defining mutual registry by said die transport assembly.

23. The apparatus of claim 22 in which:
said male die member compression surface is fashioned at said forward region with one or more depressed regions configured for compressing said breast head region while maintaining the integrity of its tissue structure.

24. Apparatus for forming a shaped meat product from a meat component of given peripheral and volumetric shape, comprising:
a plurality of female die assemblies, each with an outward side and an inward side with one or more cavities having inwardly disposed peripheral wall portions and having slots defining said meat product shape with said peripheral wall positions, first ones of said slots being configured for receiving a meat cutting blade from said outward side, and second ones of said slots being configured for receiving a meat cutting blade at said inward side;
a plurality of male die assemblies, each with an outward side and an inward side, having slots defining said meat product shape, third ones of said slots being configured for receiving a meat cutting blade from said outward side and corresponding with said second ones of said slots, and forth ones of said slots being configured for receiving a meat cutting blade from said inward side and corresponding with said first ones of said slots;

a first conveyor having a continuous sequence of interconnected support link assemblies configured for supporting said plurality of female die assemblies, said first conveyor having an upwardly disposed entrance region, an intermediate region, an exit region and a lower disposed return region extending from said exit region to said entrance region, said first conveyor having a first length extending from said entrance region to said exit region, said inward side of each said female die assembly being upwardly disposed when within said entrance, intermediate and exit regions, said entrance region defining a loading station for positioning said meat component onto said one or more female die assembly cavities and an output station receiving said shaped meat product;

a second conveyor positioned above and in alignment with said first conveyor, having a continuous sequence of interconnected support link assemblies configured for supporting said plurality of male die assemblies, said second conveyor having a downwardly disposed entrance region, an intermediate region, an exit region and an upwardly disposed return region extending from said exit region to said entrance region, said second conveyor having a second length extending from said entrance region to said exit region less than said first conveyor first length, said inward side of each said male die assembly being downwardly disposed when within said entrance, intermediate and exit regions;

a conveyor drive assembly coupled in driving relationship with said first and second conveyors and configured to move each successive male die assembly into mating, die defining registry with a corresponding female die assembly at said downwardly disposed and upwardly disposed entrance regions;

a die compression assembly located at said first and second conveyor upwardly and downwardly disposed intermediate regions effective to compressibly urge each said die defined by said mated female die assemblies and said male die assemblies toward mutual engagement;

a meat component cutting assembly located at said first and second conveyor upwardly and downwardly disposed intermediate regions, having one or more dynamically actuable first blades movable into cutting relationship with a die retained meat component through a said female die assembly outward side into and out of said first and fourth ones of said slots, and having one or more dynamically actuable second blades movable into cutting relationship with said die retained meat component through a said male die assembly outward side into and out of said second and third ones of said slots; and a blade drive actuator configured to actuate said first and second blades.

25. The apparatus of claim 24 in which said die compression assembly comprises:
a lower slide rail assembly slidably engageable with one or more outwardly disposed sides of said female die assemblies; and
an upper slide rail assembly slideably engagable with one or more outwardly disposed sides of said female die assemblies.

26. The apparatus of claim 25 in which said die compression assembly further comprises:
a compression spring assembly in compressive engagement with said upper slide rail assembly.

27. The apparatus of 25 in which:
said female die assemblies and said male die assemblies are formed of a first plastic exhibiting a first hardness characteristic; and
said lower slide rail assembly and said upper slide rail assembly are formed of a second plastic exhibiting a second hardness characteristic different than said first hardness characteristic.

28. The apparatus of 27 in which:
one said first or second plastic is an ultra high molecular weight polyethylene; and
one said first or second plastic is polyexymethylene-type acetal resin.

29. The apparatus of 24 in which:
said conveyor drive assembly is configured to drive said first and second conveyors in an intermittent fashion with a sequence of pauses in conveyor movement of duration effective to carry out positioning of said meat component at said loading station and for moving said first and second blades into and out of cutting relationship with said die retained meat component.

30. The apparatus of 29 in which:
said first conveyor further comprises a conveyor first drive shaft, a conveyor first sprocket assembly in driving relationship with said first conveyor link assemblies, and a first drive sprocket coupled in driving relationship with said first drive shaft;
said second conveyor further comprises a conveyor second drive shaft, a conveyor second sprocket assembly in driving relationship with said second conveyor link assemblies and a second drive sprocket coupled in driving relationship with said second drive shaft;
said conveyor drive assemblies comprises a drive motor having a drive output sprocket and an endless drive belt assembly extending in driven relationship about said drive output sprocket and in driving relationship about said first drive sprocket and said second drive sprocket.

* * * * *